(12) United States Patent
Wampler et al.

(10) Patent No.: US 11,921,402 B2
(45) Date of Patent: Mar. 5, 2024

(54) SYSTEMS AND METHOD FOR CAPTURING FILTER DATA ON A MATTE BOX

(71) Applicant: Light Widow, LLC, Glenwood Springs, CO (US)

(72) Inventors: Van Wampler, Glenwood Springs, CO (US); Colton Crandell, Centennial, CO (US)

(73) Assignee: Light Widow, LLC, Glenwood Springs, CO (US)

( * ) Notice: Subject to any disclaimer, the term of this patent is extended or adjusted under 35 U.S.C. 154(b) by 100 days.

(21) Appl. No.: 17/636,131

(22) PCT Filed: Sep. 4, 2020

(86) PCT No.: PCT/US2020/049319
§ 371 (c)(1),
(2) Date: Feb. 17, 2022

(87) PCT Pub. No.: WO2021/046291
PCT Pub. Date: Mar. 11, 2021

(65) Prior Publication Data
US 2022/0299842 A1 Sep. 22, 2022

Related U.S. Application Data

(60) Provisional application No. 62/896,679, filed on Sep. 6, 2019.

(51) Int. Cl.
*G03B 11/00* (2021.01)
*G06K 7/10* (2006.01)
*G06K 19/07* (2006.01)

(52) U.S. Cl.
CPC .......... *G03B 11/00* (2013.01); *G06K 7/10366* (2013.01); *G06K 19/0723* (2013.01)

(58) Field of Classification Search
None
See application file for complete search history.

(56) References Cited

U.S. PATENT DOCUMENTS

| | | |
|---|---|---|
| 6,707,044 B2 | 3/2004 | Lannestedt et al. |
| 7,158,323 B2 | 1/2007 | Kim et al. |

(Continued)

FOREIGN PATENT DOCUMENTS

| | | |
|---|---|---|
| CN | 1166001 A | 11/1997 |
| DE | 10-2011-015322 A1 | 10/2012 |

(Continued)

OTHER PUBLICATIONS

PCT International Search Report for PCT Application No. PCT/US2020/049319 dated Feb. 12, 2020 (4 pages).

(Continued)

*Primary Examiner* — Rodney E Fuller
(74) *Attorney, Agent, or Firm* — Merchant & Gould P.C.

(57) ABSTRACT

A matte box for a camera includes a frame, a filter tray holder having at least one stage configured to receive a filter, and at least one filter tray configured to support the filter. The at least one filter tray is removably coupled to the filter tray holder at the at least one stage so that the filter is positioned in front of a lens of the camera. The matte box also includes a filter information system that has an identification tag coupled to the at least one filter tray and/or the filter. The identification tag includes informational data regarding the filter. A reader device supported on the frame and configured to receive the informational data from the identification tag. The filter information system records the informational data of the filter received in the filter tray holder.

20 Claims, 14 Drawing Sheets

(56) References Cited

U.S. PATENT DOCUMENTS

| | | | |
|---|---|---|---|
| 7,561,786 B1 * | 7/2009 | Black | H04N 23/661 |
| | | | 396/57 |
| 7,929,041 B2 | 4/2011 | Okabe | |
| 8,164,673 B2 | 4/2012 | Horie | |
| 2004/0151492 A1 | 8/2004 | Blok et al. | |
| 2005/0190461 A1 | 9/2005 | Petroff | |
| 2012/0307134 A1 | 12/2012 | Morimoto | |

FOREIGN PATENT DOCUMENTS

| | | | | |
|---|---|---|---|---|
| DE | 20-2013-104541 U1 | 10/2013 | | |
| DE | 102022207225 A1 * | 5/2023 | | |
| GB | 2511943 A * | 9/2014 | | G03B 11/045 |
| JP | 10268382 A | 10/1998 | | |
| JP | 2004213552 A | 11/2004 | | |
| JP | 2007079417 A | 3/2007 | | |
| KR | 20050001106 A | 1/2005 | | |

OTHER PUBLICATIONS

PCT Written Opinion for PCT Application No. PCT/US2020/049319 dated Feb. 12, 2020 (5 pages).

\* cited by examiner

SYSTEMS AND METHOD FOR CAPTURING FILTER DATA ON A MATTE BOX

CROSS-REFERENCE TO RELATED APPLICATIONS

This application is a National Stage Application of PCT/US2020/049319, filed 4 Sep. 2020, which claims priority to and the benefit of U.S. Provisional Patent Application Ser. No. 62/896,679, filed Sep. 6, 2019, the disclosures of which are hereby incorporated by reference herein in their entirety.

INTRODUCTION

Cameras for photography and video (e.g., filmmaking and cinema) can use a matte box that attaches to a front of a camera lens. The matte box blocks unwanted light from hitting the lens, and also, houses removable filters that are placed in front of the lens. A filter tray is usually used to hold the filter and the tray is secured to the matte box so that any light that hits the front of the camera lens must travel through the filter therein. Filters can include polarizing filters, diffusion filters, daylight, day for night, neutral density filters, etc. Some known filter trays can also rotate in the matte box. Digital cameras have the ability to include information about the camera in a generated picture or video file and display the information on a camera user interface screen. For example, the camera information can include shutter angle, ISO (e.g., light sensitivity), lens settings (e.g., aperture, focal length, focal distance), etc. Matte box information such as filter type, however, is not included in this electronic informational data.

SUMMARY

In an aspect, the technology relates to a matte box for a camera including: a frame; a filter tray holder having at least one stage configured to receive a filter; at least one filter tray configured to support the filter, wherein the at least one filter tray is removably coupled to the filter tray holder at the at least one stage so that the filter is positioned in front of a lens of the camera; and a filter information system including: an identification tag coupled to the at least one filter tray and/or the filter, wherein the identification tag includes informational data regarding the filter; and a reader device supported on the frame and configured to receive the informational data from the identification tag, wherein the filter information system records the informational data of the filter received in the filter tray holder.

In an example, the filter information system further includes a user interface supported on the frame and configured to visually display the informational data of the filter received in the filter tray holder. In another example, the filter information system further includes a time clock, and wherein during the recordation of the informational data of the filter, time information is logged. In still another example, the identification tag is a radio-frequency identification (RFID) tag and the RFID tag is encoded with the informational data, and wherein the reader device is a RFID reader device. In yet another example, the recordation of the information data is based on an inductive coupling signal by the RFID reader device. In an example, the filter information system records a position of the filter within the filter tray holder. In another example, the at least one stage includes a plurality of stages and the reader device is disposed at one end of the plurality of stages, and wherein the position of the filter is based on signal strength in relation to the reader device.

In another aspect, the technology relates to a matte box for a camera including: a frame; a filter tray holder having a plurality of stages configured to receive a filter; at least one filter tray configured to support the filter, wherein the at least one filter tray is removably coupled to the filter tray holder at one of the plurality of stages so that the filter is positioned in front of a lens of the camera; and a filter information system configured to record informational data regarding the filter received in the filter tray holder.

In an example, a mounting plate is configured to secure the matte box to the lens of the camera, wherein the mounting plate includes a circumferential lock ring and a quick release lever, the quick release latch pivotable about three discrete pivot points to frictionally secure the circumferential lock ring to the lens of the camera. In another example, the filter tray holder includes two opposing sidewalls that at least partially define the plurality of stages, wherein a release lever is supported on a first sidewall of the two opposing sidewalls and biased to releasably engage at least a portion of the at least one filter tray, and a locking lever is supported on a second sidewall of the two opposing sidewalls and biased to releasably engage at least a portion of the at least one filter tray, and wherein the locking lever includes a positioning lock that locks the position of the locking lever with respect to the second sidewall.

In still another example, at least one flag is disposed opposite of the filter tray holder, wherein the matte box further includes at least one riser having a first undercut surface supported on the filter tray holder, and the at least one flag includes at least one clamp having a second undercut surface, wherein the first undercut surface engages with the second undercut surface when the at least one flag is coupled to the filter tray holder, and wherein the at least one clamp is slidable in a direction substantially parallel to the second undercut surface so as to selectively release the at least one clamp from the at least one riser. In yet another example, at least one flag is disposed opposite of the filter tray holder, wherein the at least one flag includes: a first flag member defining an elongated first track; a second flag member coupled to the first flag member with a gap therebetween; a pair of side flag members at least partially disposed in the gap between the first flag member and the second flag member, wherein each of the pair of side flag members define an elongated second track; and a screw clamp slidingly engaged with the elongated first track and the elongated second tracks, wherein as the screw clamp slides within the elongated first track, the corresponding movement in the elongated second tracks extends or retracts the pair of side flag members in a direction that is substantially orthogonal to the elongated first track.

In an example, the at least one filter tray includes: a body configured to at least partially surround a perimeter of the filter; and a compression clamp configured to secure the filter to the body, wherein the compression clamp includes: a clamp configured to engage an edge of the filter; a rod coupled to the clamp, wherein the rod is slidingly and rotatably supported by the body, and wherein the rod includes a threaded portion; and a block threadingly engaged with the rod and captured at least partially within the body, wherein the block is moveable between at least a first position and a second position relative to the body via rotation of the rod, when the block is in the first position, the rod is slidable relative to the body such that the clamp is moveable in a direction substantially orthogonal to the edge of the filter, and when the block is in the second position, the block is engaged with the body and preventing the rod from sliding to secure the clamp to the filter. In another example, the filter identification system includes: a radio-frequency identification (RFID) tag coupled to the at least one filter tray and/or the filter, wherein the identification tag includes the informational data regarding the filter; a RFID reader device supported on the frame and configured to receive the information data from the identification tag; and a user interface supported on the frame and configured to visually display the information data of the filter received in the filter tray holder.

In another aspect, the technology relates to a method of capturing informational data of a filter within a matte box for a camera, the method including: encoding a radio-frequency identification (RFID) tag with the informational data of the filter, wherein the RFID tag is coupled to a filter tray that supports the filter and/or the filter; transmitting a reader signal by a RFID reader device supported on a frame of the matte box; receiving a response signal from the RFID tag at the RFID reader device containing the informational data of the filter; recording the informational data at the matte box; and visually displaying at least a portion of the informational data on a user interface of the matte box.

In an example, the method further includes determining a position of the filter within the matte box, recording the position, and displaying the position on the user interface. In another example, recording the informational data includes logging time information from a time clock running within the matte box. In still another example, transmitting the reader signal by the RFID reader device is based on an inductive coupling signal of the RFID tag being disposed adjacent the RFID reader device. In yet another example, the method further includes sending at least a portion of the recorded information data to the camera. In an example, the method further includes syncing a running time clock within the matte box with an external timecode generator.

These and various other features as well as advantages that characterize the matte boxes described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

BRIEF DESCRIPTION OF THE DRAWINGS

The following drawing figures, which form a part of this application, are illustrative of described technology and are not mean to limit the scope of the invention as claimed in any manner, which scope shall be based on the claims appended hereto.

DETAILED DESCRIPTION

It is to be understood that both the foregoing introduction and the following detailed description are exemplary and explanatory and are intended to provide further explanation of the invention as claimed. Throughout this description, references to orientation (e.g., front(ward), rear(ward), top, bottom, back, right, left, upper, lower, etc.) of the matte box relate to its position when installed on a camera and are used for ease of description and illustration only. No restriction is intended by use of the terms regardless of how the matte box is situated on its own.

The matte boxes described herein are configured to capture filter information (e.g., name, type, position, etc.) from the filters disposed therein and use the filter information to increase operational performance of the matte box. Additionally, the captured filter information increases efficiencies during post-operation of the matte box when working with the camera files. For example, by capturing filter information directly on the matte box, the filter information is automatically displayed directly on the matte box so as to assist users thereof. Additionally, the filter information is recorded so that post-production use of camera files can have the filter information incorporated therein, thereby increasing post-production efficiencies that use the filter information. In examples, the filters have an associated tag that is read by a reader system within the matte box. The information from the tag (e.g., filter name, type, position, etc.) can be displayed on the matte box, as well as recorded for later use. Additionally, the matte box can determine a position (e.g., stage position, vertical position, rotational position) of the filter within the matte box for display and recordation. In some examples, the filter information can be sent directly to the camera and embedded within the files, while in other examples, the filter information can be meshed with the camera files after the camera files are generated.

Furthermore, the matte boxes described herein are configured to increase overall performance of the matte box during use. For example, a quick release lock ring is provided so that the matte box is more easily securable to the front of the camera lens. A filter tray holder of the matte box includes a pair of levers that make securing the filter and filter tray to the matte box more secure and efficient. A filter tray includes a compression clamp that makes securing the filter to the filter tray more secure and efficient. A flag includes a clamp connection system that allows the flag to be easily snapped on the matter box, while also enabling a quick release. The flag also includes side members that are extendable and retractable with a single screw clamp.

Figure 1:
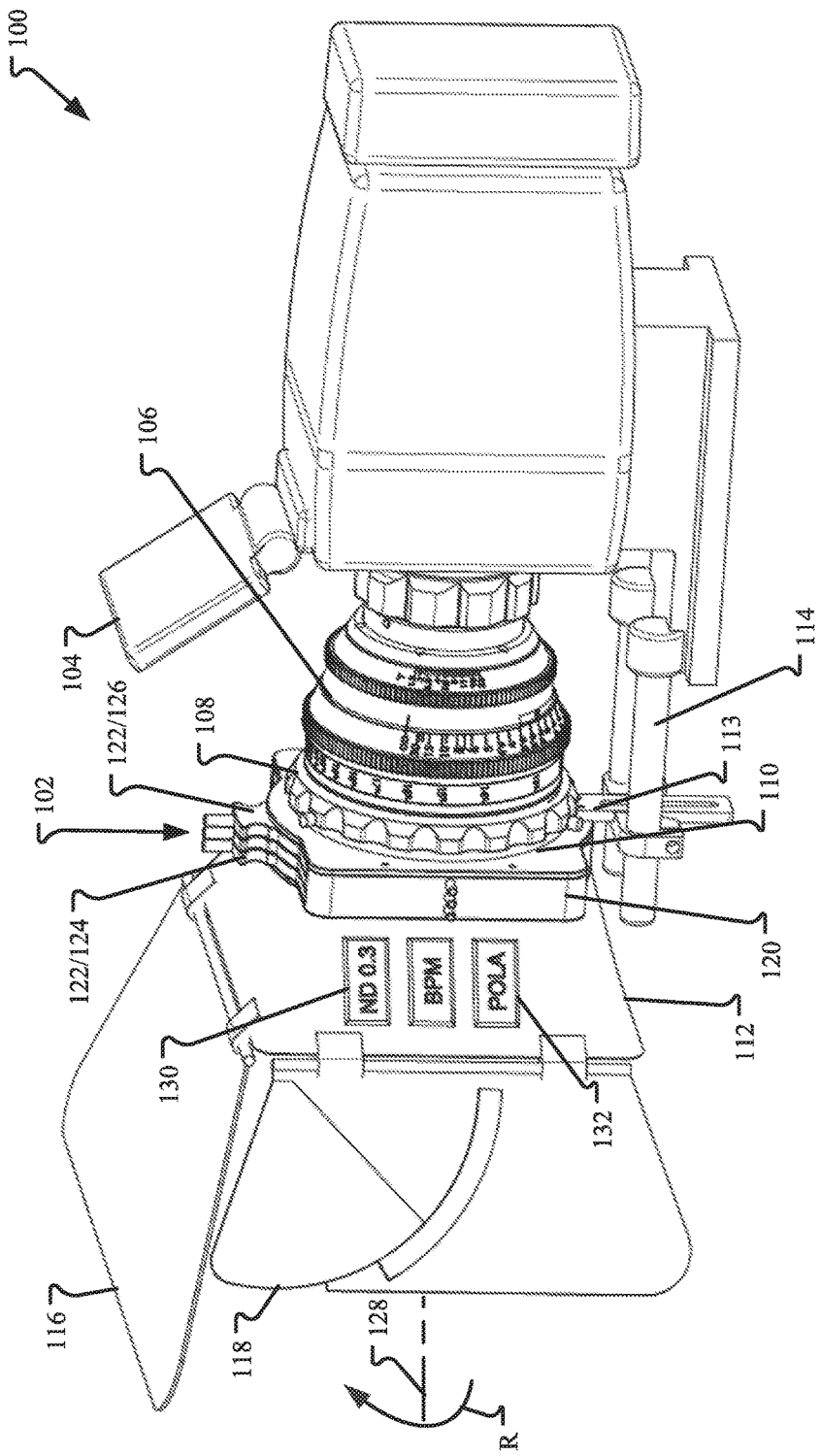
FIG. 1 is a side view of a camera and a prior art matte box.

FIG. 1 is a side view of a camera 100 and a prior art matte box 102. The camera 100 includes one or more display screens 104 (e.g., a primary and a secondary display) and a lens assembly 106. Attached to the front of the lens assembly 106 is the matte box 102. The matte box 102 includes a frame 108 having a first end 110 that is sized and shaped to be removably attached to the lens assembly 106 and an opposite second end 112 that extends from the front of the camera 100 when the matte box 102 is attached. In the example, the first end 110 of the matte box 102 is attached to the camera 100 by a swing arm 113 coupled to one or more of a pair of rods 114 disposed underneath the lens assembly 106. This is called a rod mounted matte box. In other examples, the first end 110 of the matte box 102 can be attached directly to the front of the lens assembly 106. The second end 112 can include one or more flags attached to the outer perimeter. For example, a top flag 116, a bottom flag (not shown), and left and/or right flags 118. The flags 116, 118 and the second end 112 are configured to block light from hitting the front of the lens assembly 106. In some examples, the matte box 102 can also include a removable matte (not shown) that couples to the second end 112 of the frame 108 so as to block the lens assembly 106 and define an aspect ratio, for example.

Between the first end 110 and the second end 112 the frame 108 includes a filter tray holder 120. The filter tray holder 120 has one or more stages that are each configured to receive a filter tray 122 that holds a filter (not shown). In the example, the filter tray holder 120 includes three stages, a forward stage 124, a rearward stage 126, and a middle stage, so that three filter trays 122 with filters can be used. In other examples, the filter tray holder 120 can have any other number of stages as required or desired (e.g., a single stage, two stages, five stages, etc.). In some examples, at least a portion of the filter tray holder 120 (e.g., the second stage 126) can rotate R about a longitudinal axis 128 that extends between the first end 110 and the second end 112 of the frame 108. The filter(s) supported by the matte box 102 selectively transmits light of different wavelengths as required or desired.

In operation, filter tags 130, 132 can be used to visually display the information of which filters are disposed within the filter tray holder 120 (e.g., position and type). The filter tags 130, 132 are typically placed on the side of the second end 112 and made of tape or Velcro and are often hand written. For example, top filter tag 130 can provide filter type information for the filter within the forward stage 124, while bottom filter tag 132 can provide filter type information of the filter within the rearward stage 126. Generally, the order of the filter tags 130, 132 is from top to bottom and corresponds to the filters ordered from front to back in the filter tray holder 120. This filter type information can then (sometimes) be written down in an assistant's notes for further use. This process, however, can often lead to filter type information being missing during post-production of the camera image (e.g., video or picture file) because everything is being done manually on set.

Figure 2:
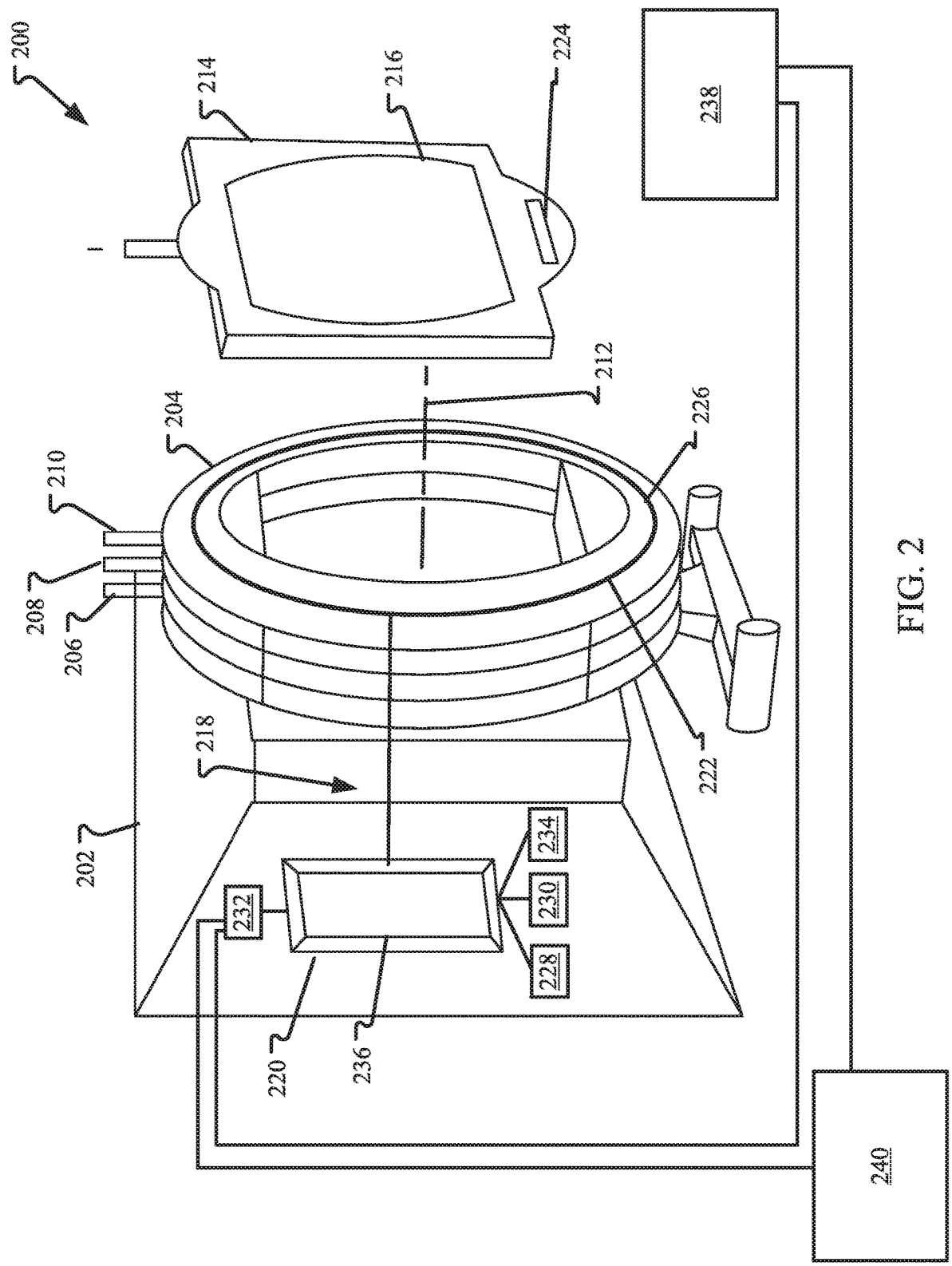
FIG. 2 is a rear perspective view of an exemplary matte box.

FIG. 2 is a rear perspective view of an exemplary matte box 200. Similar to the example described above, the matte box 200 includes a frame 202 and a filter tray holder 204 that is configured to be placed in front of a lens assembly of a camera (not shown). In this example, however, the filter tray holder 204 has three stages 206, 208, 210 axially spaced adjacent to one another along a longitudinal axis 212. Each stage 206, 208, 210 is sized and shaped to hold a filter tray 214 with a filter 216 coupled thereto. This configuration enables the filter 216 to be placed in front of the lens assembly of the camera. In some examples, one or more of the stages 206, 208, 210 can allow for the filter tray 214 to rotate about the longitudinal axis 212 as required or desired. Additionally in this example, the matte box 200 includes a filter information system 218 that is configured to capture what filter 216 is disposed within the filter tray holder 204 and/or what position (e.g., stage) the filter 216 is paced within. In other examples, the filter tray holder 204 and/or filter 216 may be incorporated within a 3D camera set or rig such that the 3D camera has one or more filter stages and the filter information system 218.

The filter information system 218 includes a filter capture system 220 that is coupled in electronic communication with a reader device 222 coupled to and supported by the filter tray holder 204. The filter capture system 220 is configured to capture the filter information data (e.g., by controlling the reader device 222), and control the storage and display of the collected filter information data. Additionally, a tag 224 can be coupled to the filter 216 and/or the filter tray 214. In the example, the tag 224 is coupled to the filter tray 214. The tag 224, however, can also be coupled directly to the filter 216 as required or desired. For example, the tag 224 can be attached around the edge of the filter 216 or the tag 224 can be embedded within the filter 216. As such, the filter 216 can also be inserted directly within the matte box 200 and the filter tray 214 need not be used.

In some examples, the filter capture system 220 and its components thereof may be supported within the frame 202 of the matte box 200. In other examples, the filter capture system 220 and its components thereof may be housed in discrete display device. Examples of the display device are described below in reference to FIG. 4. The display device can be configured to removably couple to the exterior of the frame 202. In some examples, the display device may removably slide or clip on and include electrical contacts so as to couple to the reader device 222.

In the example, the reader device 222 and tag 224 are a radio-frequency identification (RFID) system. For example, the RFID tag 224 is passive and the RFID reader device 222 is an active reader so that power does not have to be provided to the tag 224 and the filter tray 214 and/or filter 216. It should be appreciated that the RFID system can be other types as required or desired, for example, a passive reader and an active tag. Additionally or alternatively, the reader device 222 and tag 224 system can be any other system that enables the matte box 200 to function as described herein. For example, an optical system (e.g., barcode or QR code), electrical contact system, solid state data system, physical read points, combinations of one or more systems, etc.

The reader device 222 includes an antenna 226 that extends at least partially around a perimeter of the filter tray holder 204 so as to generate a signal that is able to read the RFID tag 224. The antenna 226 can be supported on the filter tray holder 204 or the frame 202 as required or desired. In some examples, the antenna 226 can be a substantially straight wire. In other examples, the antenna 226 can be substantially circular so as to generate a substantially torus signal pattern. The antenna 226 generally extends in a shape that can more efficiently read the passive RFID tag 224 while reducing interference with other components of the matte box 200. In some examples, the antenna 226 can include one or more signal shields (not shown) so as to direct the RFID signal in a direction substantially parallel to the longitudinal axis 212. This enables the reader device 222 to read the replies from the tag 224 at any location on the filter tray 214 and/or the filter 216. As such, the reader device 222 can also determine a rotational angle of the filter 216 relative to the longitudinal axis 212 and/or an offset position (e.g., a direction substantially parallel to the longitudinal axis 212) of the filter 216 within the filter tray 214 if the filter is only partially inserted within the filter tray holder 204.

Additionally, RFID signal strength can be used to determine the position of the filter 216 within the stages 206, 208, 210. This position of the filter 216 is axially along the longitudinal axis 212. Further, the RFID signal can be directed specifically in relation to the matte box 200 so that adjacent tags (e.g., on the filter trays that are not being used and still located within the camera bag) are not read and picked-up. In other examples, the reader device 222 can be disposed within the filter capture system 220 as required or desired. In the example, by placing the antenna 226 around the perimeter of the filter tray holder 204, the antenna does not obstruct the view of the camera. In other examples, the antenna 226 may be disposed within the display device illustrated in FIG. 4. In still other examples, the antenna 226 may be split into two or more discrete antennas disposed on the matte box 200.

In the example, the filter information system 218 (e.g., filter capture system 220 and reader device 222) may be integral with the matte box 200 (e.g., built into the matte box) or can be a separate kit that removably attaches to the matte box 200 as required or desired. For example, the filter information system 218 may be a kit that can upgrade the prior art matte box 102 described in FIG. 1. It should be appreciated that the components of the filter information system 218 can be separated between the matte box, camera, etc. and so as to enable filter informational data to be used during post-production work of the camera files.

In certain aspects, the filter capture system 220 is a computing device that includes at least one processor 228, at least one memory 230, a power source 232 (e.g., a battery), a communication device 234, and a display screen 236. The filter capture system 220 acts as a controller for the reader device 222 and also can provide the power thereto (e.g., via electrical contact connectors). The communication device 234 enables the filter capture system 220 on the matte box 200 to couple in communication to one or more remote device(s) (e.g., a camera, a user device, or any other external device such as a timecode generator). These communication connections can be in a wired communication network or a wireless communication network. Wireless communication can include infrared, BLUETOOTH®, wireless technology, WiFi, cellular, or other frequency communication systems as required or desired.

In the example, the filter capture system 220 can couple in communication to a camera 238 and/or a user device 240 (e.g., a smartphone, tablet, or other computing device). In some examples, the user device 240 and the camera 238 can also couple in direct communication as required or desired. The filter capture system 220 and/or user device 240 can also couple in communication to any other remote device (not shown) as required or desired. As such, data can be sent and received between the various components of the system as required or desired. For example, a remote timecode generator device (not shown) for a timecode sync.

In an aspect, the user device 240 can couple to one or more remote devices (e.g., the camera 238 or another timecode device) to capture a generated timecode for a timecode sync. In another aspect, the filter capture system 220 can couple to one or more remote devices (e.g., the camera 238 or another time code device) to capture a generated timecode for a timecode sync. The filter capture system 220 can then store the information generated from the RFID tag 224 and the associated timecode. In some examples, this information may additionally or alternatively sent to the user device 240.

The filter capture system 220 may support a user interface that is operable by any number of input/output devices or ports as required or desired. For example, interface buttons, USB port, micro SD memory readers, etc. In an aspect, the RFID tag 224 information and the associated timecode can be stored in a removable micro SD card as well as any other information regarding the matte box 200 as required or desired for further use. In other aspects, the filter capture system 220 can send the RFID tag 224 information to the user device 240 and/or the camera 238 as required or desired.

Additionally or alternatively, the matte box 200 may include a matte (not shown) that is attached to the front of the frame 202. The matte can be an aspect ratio matte that is used to block out a portion of the frame 202. The matte can include an RFID tag or any other information reading system so that the filter information system 218 can also detect a matte type that is used with the camera 238.

Figure 3:
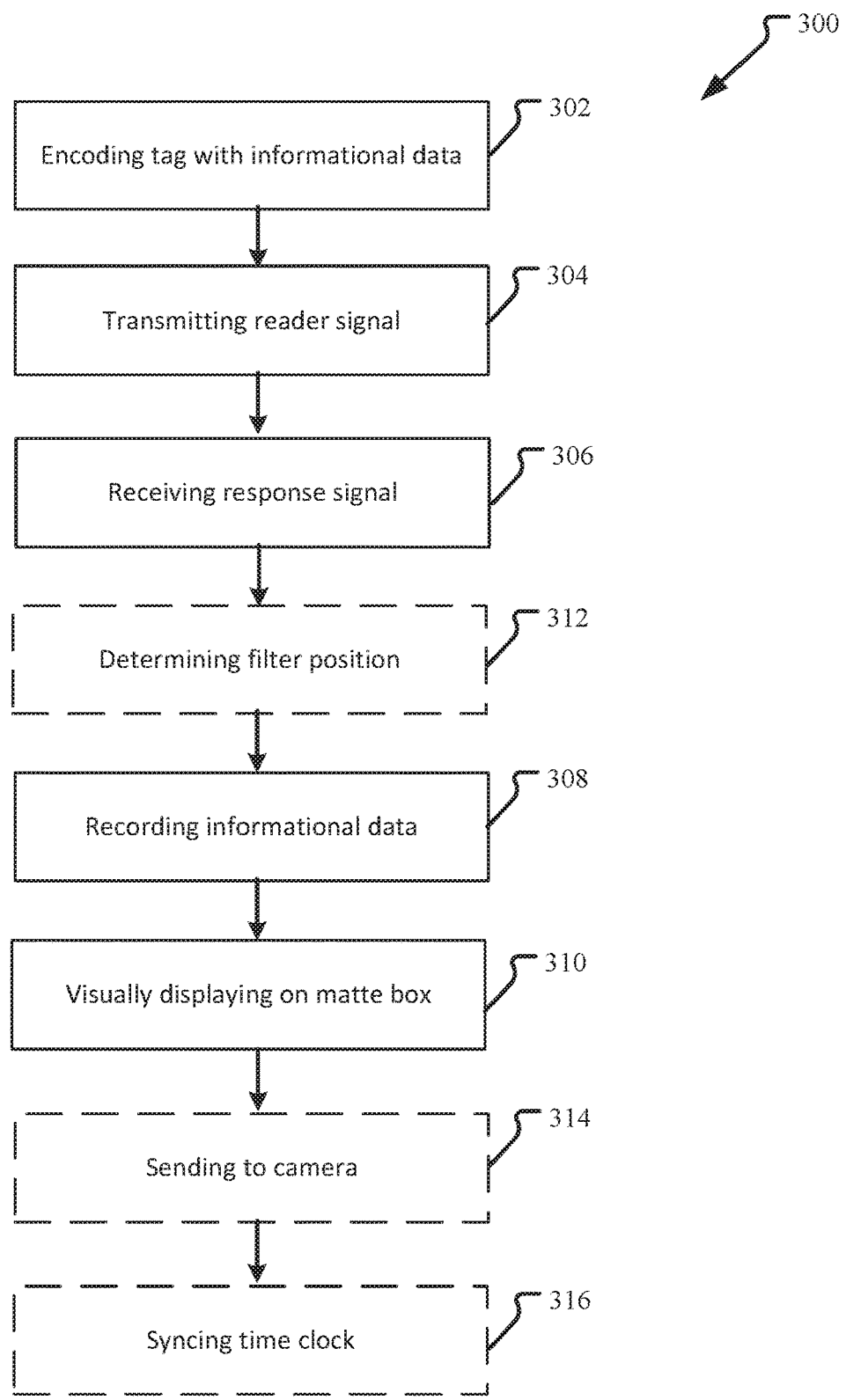
FIG. 3 is an exemplary flowchart for capturing informational data of a filter within a matte box.

FIG. 3 is an exemplary flowchart 300 for capturing informational data of the filter 216 within the matte box 200. With continued reference to FIG. 2, in operation, the tag 224 may be encoded (operation 302) with informational data regarding the attached filter 216. Filter informational data can be a type or name of the filter, a product number, a unique ID number, etc. In some examples, the informational data contains the type of the filter 216 and the tag 224 can be a read/write tag that can have data changed (e.g., for custom filter names). In other examples, the informational data includes a number or code that is related to the tag 224 (e.g., a read only tag) such that the tag 224 number can be related to the type of the filter 216 and contained in a database stored in the filter capture system 220.

The reader device 222 continuously (e.g., periodically) reads for the tag 224 so as to determine what filter is within the filter tray holder 204. For example, the reader device 222 transmits a reader signal for the tag 224 (operation 304). The transmission can occur upon a predetermined time period (e.g., every two seconds, every minute, etc.). In other examples, the reader device 222 can selectively read for the tag 224, e.g., upon insertion or removal of the filter 216. For example, when RFID tags are utilized, inductive coupling of the tag 224 can be used as a signal to read the tag 224 and collect information about the filter 216. In other examples, inductive coupling induced by the tag 224 can be used to only wake up the reader device 222, which then goes through the process of reading the tag 224. The reader signal induces the tag 224 to reply to the reader device with a response signal (operation 306). This response signal contains the informational data encoded within the tag 224.

Once the filter capture system 220 has the informational data of the filter 216 within the matte box 200, the information data is recorded and stored (operation 308). In this example, the type of the filter 216 may be stored in the informational data so it can be pulled directly from the response signal. In some examples, this stored information (e.g., filter type and/or position) can be stored in a removable memory device to then be used to mesh with the camera files in a separate process. In other examples, recording the informational data includes logging time information from a time clock running within the matte box 200 so that the filter data from the matte box is easier to mesh with other files. In still other examples, the information data may include select camera information, such as, but not limited to, camera lens information and/or focal length. In further examples, the filter capture system 220 can determine the type of the filter 216. For example, the informational data includes a number or a code that is used to look-up the type of the filter 216 that is locally stored within a database. The type of the filter 216 (e.g., a name) pulled from the database can then be recorded along with a time stamp. In aspects, the informational data determined by the matter box 200 may be sent directly to the camera as required or desired.

At least a portion of the informational data is then visually displayed on the display screen 236 of the filter capture system 220 and on the matte box 200 (operation 310). This allows for the camera operator and/or camera assistants to visually see what filters 216 are within the matte box 200 without having to take the filters out. In some examples, the displayed position of the filters 216 (e.g., front to back) on the user interface can be modified on the display screen 236 via one or more buttons. In other examples, the reader device 222 can also determine the position of the filters 216, record the filter position, and automatically display the position on the display screen 236 (operation 312). For example, the reader device 222 can determine which stage 206, 208, 210 the filter 216 is located in. In other examples, the reader device 222 can determine what rotational angle (e.g., relative to the longitudinal axis 212) the filter 216 is in. Determining the rotational angle can be desirable when polarized filters or graduated filters are used. Additionally, rota-pola filters are typically positioned at the stage that is closest to the camera lens. In yet another example, the reader device can determine what vertical position the filter 216 is in. In some examples, the filter 216 may only be partially inserted into the matte box. In still other examples, the reader device can determine what tilt position the filter 216 or matte box is in. For example, the filter 216 may be tilted so as to reduce or prevent reflection, while in other examples, the filter tray holder may be tilted relative to the camera lens. These filter positions (e.g., stage, rotation, vertical, and/or tilt) can be determined by signal strength, tag location on the filter, or any other method that enables the position of the filter 216 to be determined as described herein.

In some examples, the informational data of the filter 216 can also be sent to the camera 238 (operation 314) via the filter capture system 220. This enables the filter type to be displayed on the camera screen and/or included within the camera files, and enables the type of filter to be directly embedded within the camera files for use in post-production as required or desired. Additionally or alternatively, the informational data of the filter 216 can be sent to the user device 240 via the filter capture system 220. The user device 240 can synchronize with a timecode generated on the camera or other timecode device so that the informational data of the filter 216 can be linked with the camera file without directly going through the camera (e.g., operation 312). In other examples, the user device 240 can have its own timecode that includes the informational data of the filter 216, which then is synchronized with the timecode from the camera 238.

In some examples, the filter capture system 220 can have its own running time clock that can be synced with an external timecode generate (operation 316). The informational data of the filter and the timecode information can be stored locally within the filter capture system 220 for use (e.g., via a removable memory device), and/or stored internally or externally as required or desired.

Figure 4:
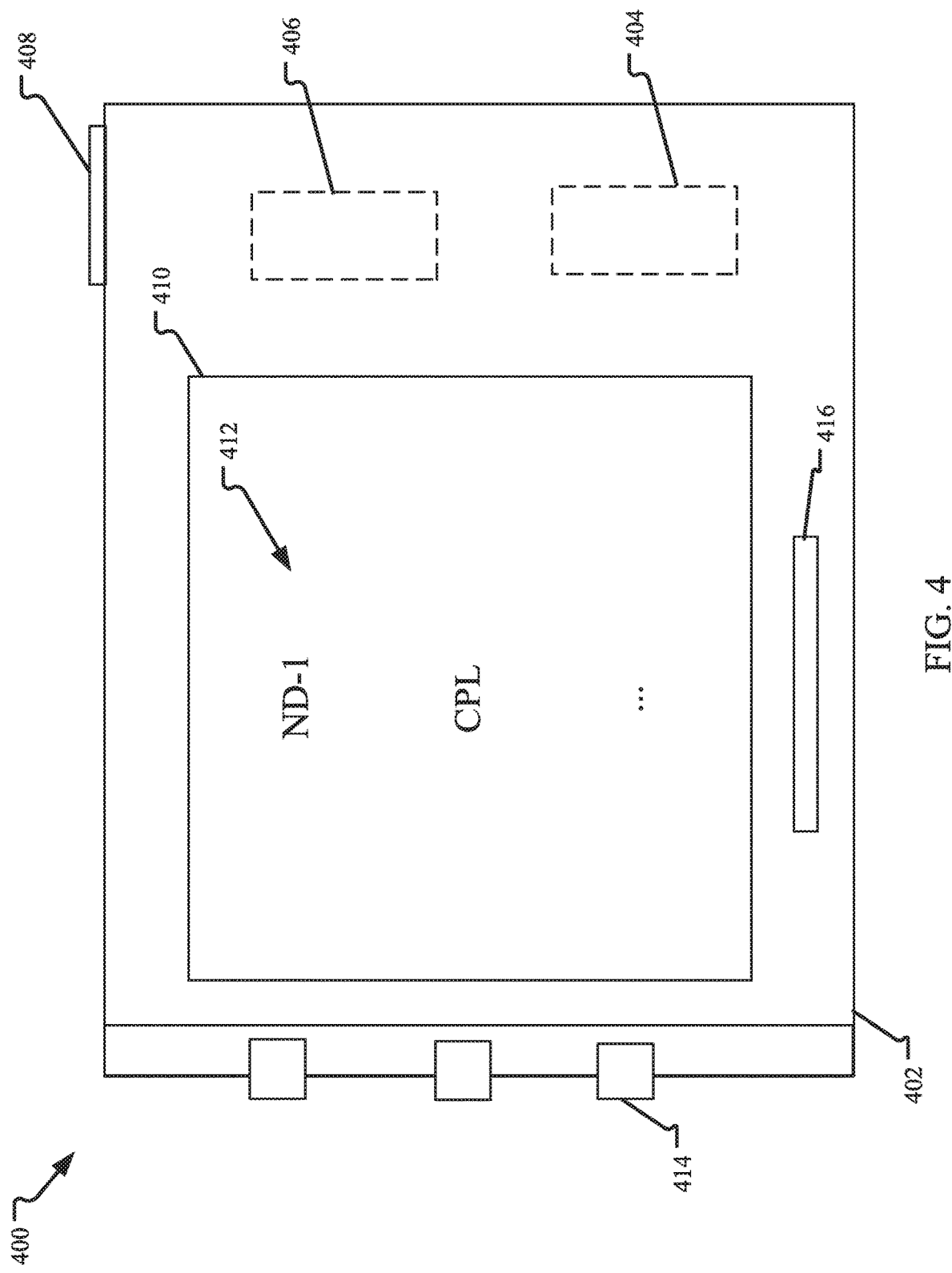
FIG. 4 is a perspective view of an exemplary display device.

FIG. 4 is a perspective view of an exemplary display device 400. As described above, the system components that are used to capture the filter information are mounted within the matte box itself. In this example, however, the display device 400 is utilized to house the system components so that it is easier to retrofit existing matte boxes and capture filter information. For example, the display device 400 can attach to the matte box using Velcro. The display device 400 includes a housing 402 for an internal reader device 404 that is configured to read an external tag that is coupled to the filter or filter tray (both not shown). A controller 406 (e.g., a circuit board with memory, processor, communication device, etc.) is used for operational control of the display device 400 and the reader device 404. A battery compartment 408 allows the display device 400 to receive a power source so as to power the components within the display device 400. In other examples, the reader device 404 may be coupled to an external power source, such as, being daisy chained through the camera and/or motor mount.

The display device 400 also includes a user interface having a display screen 410 that is configured for a three stage matte box and includes three different display lines 412 for the filter type (e.g., filter name). It should be appreciated that the display device can be configured for any other stage matte box as required or desired, for example, two-stages, five stages, etc. Each display line 412 can be associated with a button 414. The buttons 414 can be used to manually modify the position of the filter type on the display as required or desired. The display screen 410 can also be controlled by an interface/brightness button 416.

In examples, the display device 400 can include a database of common filter types so as to easily relate to the information of a tag. In some examples, the database can be modified so that custom filter types can be included as well as any other stored data as required or desired. In some examples, this modification may be performed via a USB connection. The buttons 414, 416 can be used to facilitate this database modification. In other devices, the display device 400 can connect to a user device such that an application and user interface can be used to modify the filter type database. Additionally, in this example, the reader device antenna is disposed within the display device 400.

Figure 5:
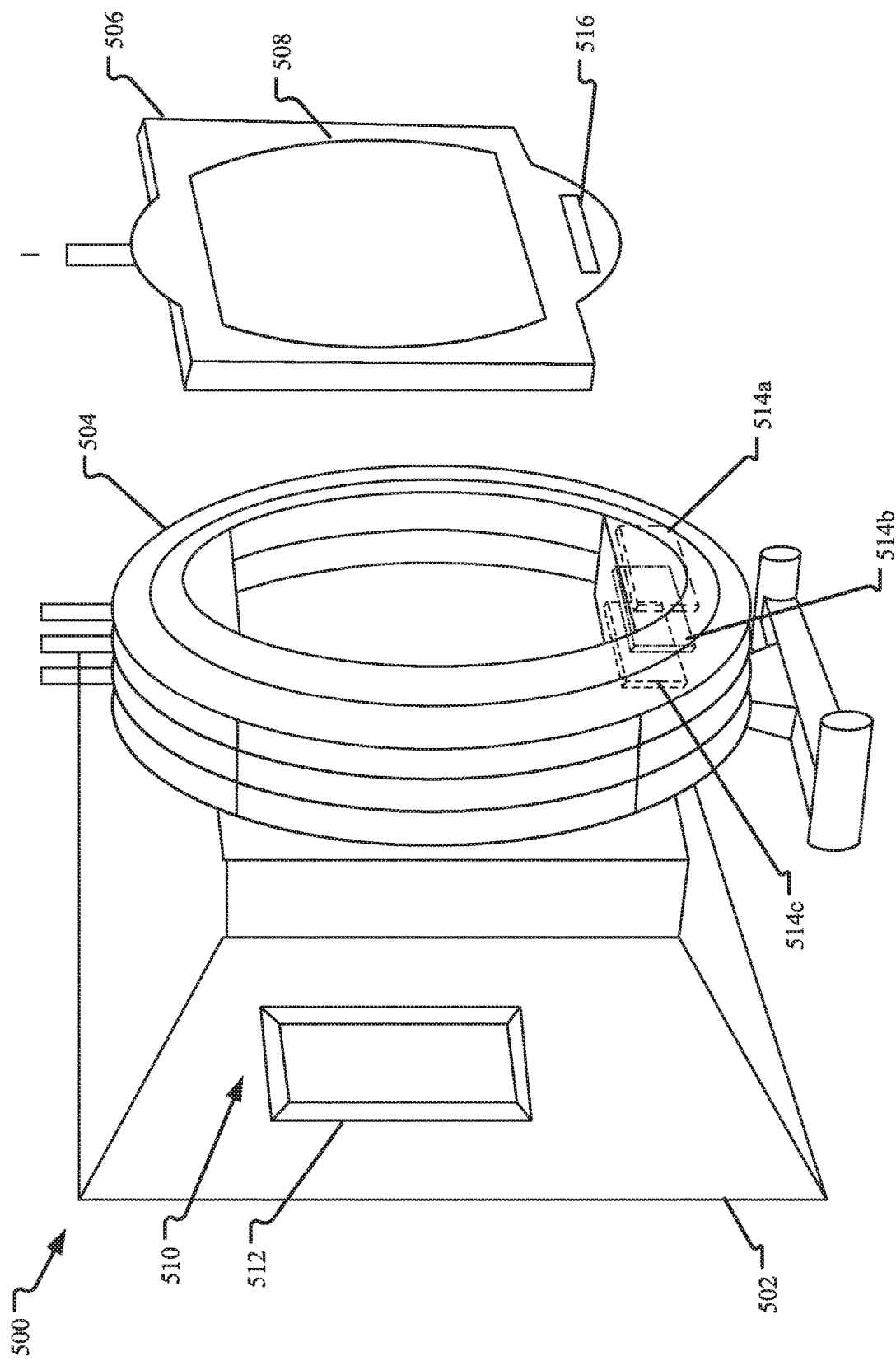
FIG. 5 is a rear perspective view of another exemplary matte box.

FIG. 5 is a rear perspective view of another exemplary matte box 500. Similar to the examples described above, the matte box 500 includes a frame 502 and a filter tray holder 504 with three stages. Each stage is sized and shaped to receive a filter tray 506 that holds a filter 508. A filter information system 510 includes a filter capture system 512 and a reader device 514 configured to read a tag 516. In this example, however, each stage of the filter tray holder 504 includes its own reader device 514a, 514b, 514c so as to more easily determine the stage position of each filter 508 via the tag 516.

Figure 6:
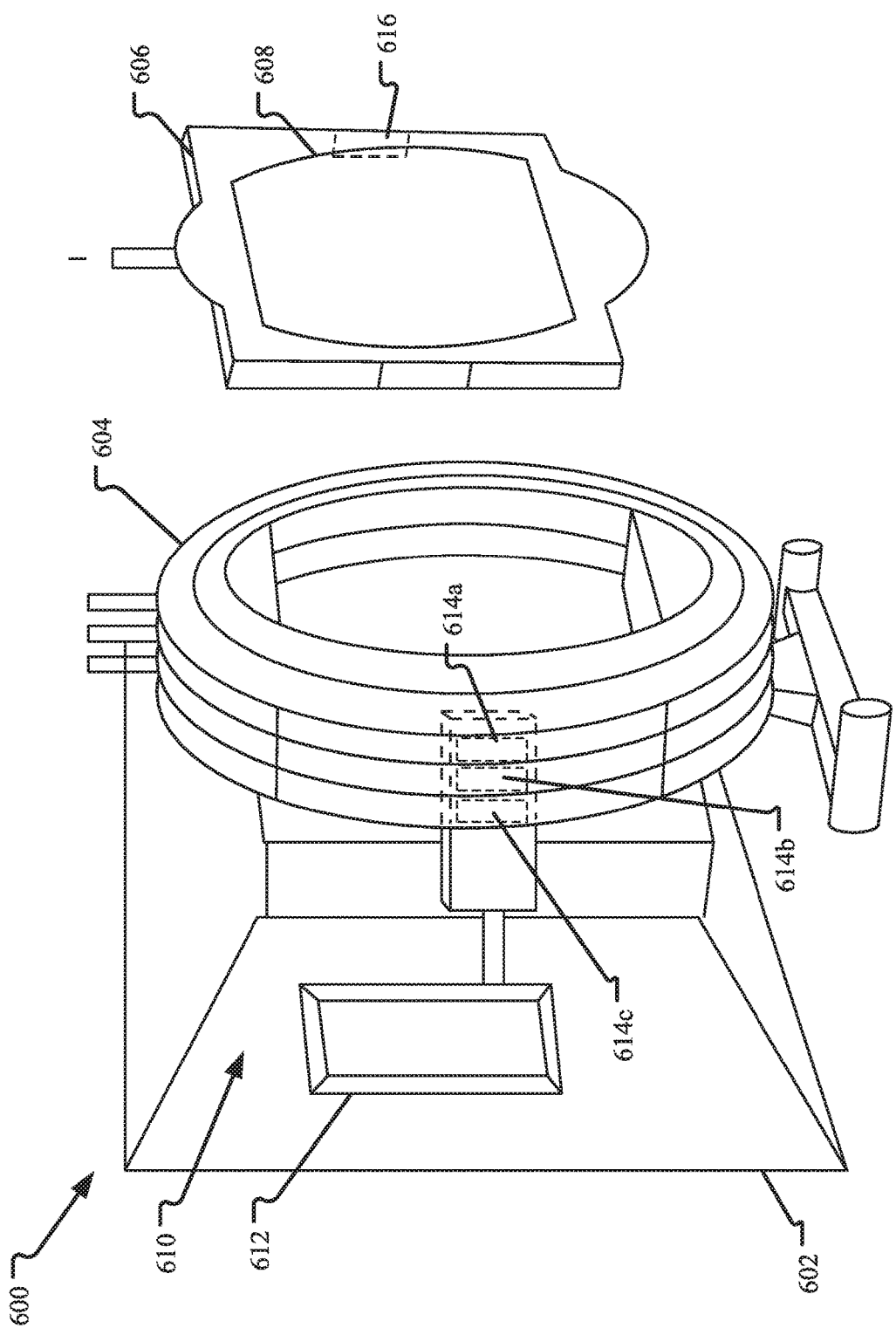
FIG. 6 is a rear perspective view of another exemplary matte box.

FIG. 6 is a rear perspective view of another exemplary matte box 600. Similar to the examples described above, the matte box 600 includes a frame 602 and a filter tray holder 604 with three stages. Each stage is sized and shaped to receive a filter tray 606 that holds a filter 608. A filter information system 610 includes a filter capture system 612 and a reader device 614 configured to read a tag 616. Similar to the example in FIG. 5, each stage of the filter tray holder 604 can include its own reader device 614a, 614b, 614c so as to more easily determine the stage position of each filter 608 via the tag 616. In this example, however, the reader device 614 may be located on a side of the filter tray holder 604 instead of the bottom (as in FIG. 5). By locating the reader device 614 on the side of the matte box 600, access to the reader device 614 is easier.

Figure 7:
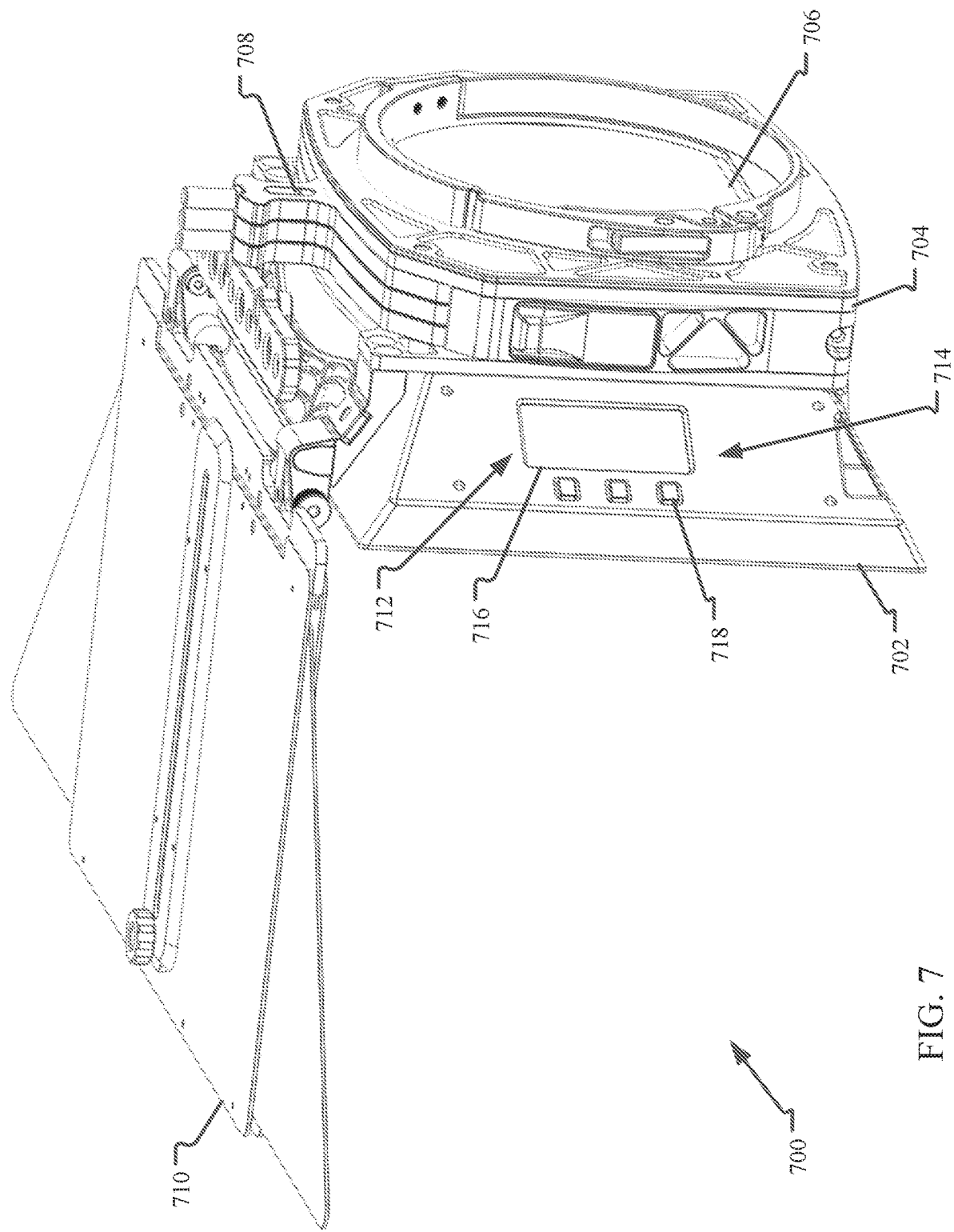
FIG. 7 is a perspective view of another exemplary matte box.

FIG. 7 is a perspective view of another exemplary matte box 700. The matte box 700 includes a frame 702 and a filter tray holder 704. The frame 702 acts as a shroud for the camera lens (not shown) and is described in more detail below and in reference to FIG. 8. The filter tray holder 704 has at least one stage configured to receive a filter 706. In the example, the filter tray holder 704 has three stages, although other stage numbers (e.g., two, four, or five) are also contemplated herein. The filter tray holder 704 is described in more detail below and in reference to FIGS. 10-12. The filter 706 is supported by a filter tray 708. The filter tray 708 is configured to be removably coupled to the filter tray holder 704 so as to selectively position the filter 706 in front of the camera lens. The filter tray 708 is described in more detail below and in reference to FIG. 9. The matte box 700 also includes at least one flag 710 removably coupled to the matte box 700 opposite of the filter tray holder 704 and configured to pivot relative thereto. The flag 710 is described in more detail below and in reference to FIGS. 13-15.

In this example, the matte box 700 is configured to capture informational data of the filters 706 being used within the matte box and as described herein. The matte box 700 includes a filter information system 712 that is configured to read and record the informational data of the filters 706. The filter information system 712 includes a user interface 714 supported on the frame 702 that enables the matte box user to interact with the matte box 700. The user interface 714 can include a display screen 716 that is configured to visually display the informational data of the filter 706 received within the filter tray holder 704. For example, the display screen 716 can display the name or type of the filter 706. In other examples, a code or a symbol corresponding the name or type of the filter 706 can be displayed. In still other examples, the display screen 716 can be configured to display any other additional information regarding the matte box 700. For example, camera lens type, focal length of the lens, hard matte use, aspect ratio, flag position, etc. The user interface 714 can also include one or more buttons 718 that assist with the use of the filter information system 712. For example, the user can use the buttons 718 to move the position of the displayed filter 706. In other examples, the buttons 718 can be used to control operations of the filter information system 712. For example, initiate a time sync function, etc. The filter information system 712 is described in more detail below.

Figure 8:
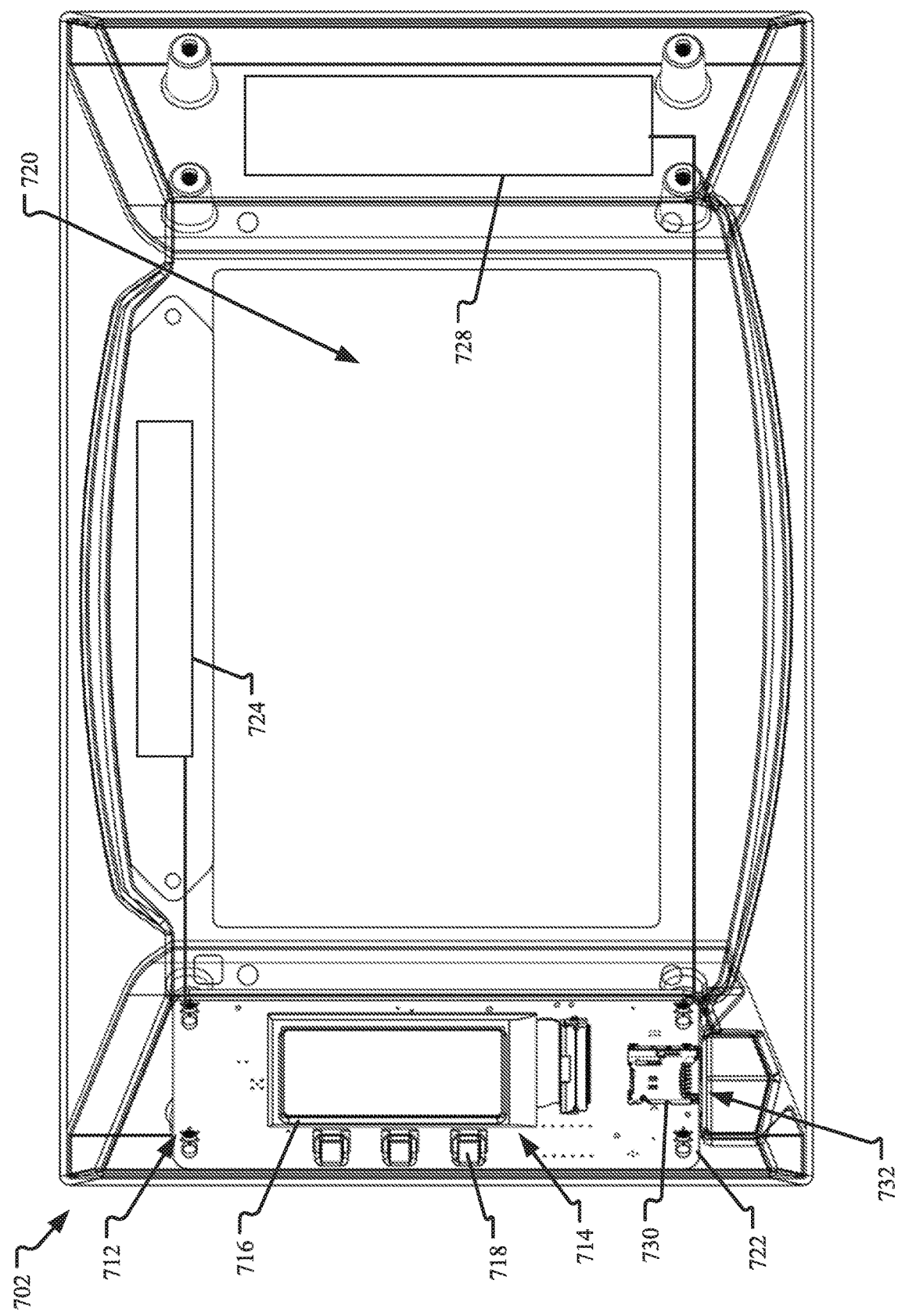
FIG. 8 is a rear view of a frame of the matte box shown in FIG. 7.

FIG. 8 is a rear view of the frame 702 of the matte box 700 (shown in FIG. 7). A back cover of the frame 702 is illustrated as transparent so that the components of the filter information system 712 are shown. The back cover of the frame 702 is configured to be coupled to the filter tray holder 704 (shown in FIG. 7). The frame 702 has an opening 720 that allows light to reach the camera lens. The filter information system 712 is supported by the frame 702 and includes a controller 722 that is configured to record informational data regarding the filter(s) received in the filter tray holder. In the example, the controller 722 is a circuit board with memory and processors that enable the matte box to function as described herein. It should be appreciated that the controller 722 can have any other structure that enables the filter information system 712 to function as described herein. The user interface 714 (display screen 716 and buttons 718) is operable via the controller 722.

The filter information system 712 includes a reader device 724 supported on the frame 702 and configured to read informational data from a tag 726 (shown in FIG. 9) disposed on a filter or filter tray. In the example, the reader device 724 is positioned at a top rail of the frame 702 and at the end of the plurality of stages. In this position, the reader device 724 has a relatively direct path to the filters and filter trays without interference from other components. In other examples, the reader device 724 can be positioned at any other location on the frame 702 as required or desired. In the example, the reader device 724 is a radio-frequency (RFID) active reader device and the tag 726 is an RFID passive tag. In other examples, the reader device and tag can be any other system that enables the matte box to function as described herein.

A power source 728, for example, a battery pack, can be used to power the filter information system 712. In the example, the power source 728 is disposed opposite of the controller 722 and can have a removable cover for access to a removable or rechargeable battery pack. In other examples, the matte box can be coupled to an external power source as required or desired. For example, the matte box can couple to the camera and be powered by the camera. In another example, the matte box can couple to the lens motor control for the camera and be powered by the motor control. Other configurations are also possible. For example, the frame 702 may include a solar panel (not shown) so as to power the electronic components of the matte box.

As illustrated, the power source 728 is disposed on one side of the frame 702 and the display screen 716 is disposed on the other. It should be appreciated, that components of the filter information system 712 can be disposed anywhere and/or duplicated as required or desired. For example, the each side of the frame 702 may include a display screen 716.

In operation, the reader device 724 receives informational data regarding the filter (e.g., type, name, etc.) and the controller 722 records the received information data and visually displays the informational data on the display screen 716. In some examples, the reader device transmits a reader signal to gather the filter data on a predetermined time frequency. In other examples and by using an RFID system, the filter being inserted into or removed from the matte box generates an inductive coupling between the reader device 724 and the tag 726, and this signal can be used to wake-up the reader device and trigger it to transmit a reader signal so that the informational data for the filter can be recorded. In this system, power consumption is more accurately controlled.

In addition to the filter data from the tag 726, the filter information system 712 can also determine stage position of the filter. This enables for the position sequence of multiple filters to be recorded and displayed. In an example, stage position of the filter can be determined by signal strength of the reader device 724 and tag 726 interaction. This can be enabled by the reader device 724 being substantially aligned with the position of the tag 726 on the filter tray when the filter tray is installed. Additionally or alternatively, rotational position of the filter can be determined by the filter information system 712. For example, the rotational position of a polarized filter (e.g., a rota-pola filter) can be recorded and displayed. In further examples, a vertical position of the filter within the matte box (e.g., a partially inserted filter) can be determined by the filter information system 712. For one or both of rotational and vertical positioning, the position can be based on signal strength, use of an elongated tag or multiple tags on the filter or filter tray, or any other method as required or desired.

In another example, the filter information system 712 can read and detect specialized filter trays such as a diopter (e.g., used for close focus situations), a rota-pola (e.g., used for rotatable polarizing filters), and/or an anti-reflection (e.g., can tilt and eliminate reflections) (all not shown) coupled to the matte box. This can be done with a tag (e.g., a RFID tag) on the specialized tray or any other tag/sensor as required or desired. Additionally, these specialized trays may also include additional features, for example, determining the rotational angle on the rota-pola tray, the tilt angle on the ant-reflection tray, and/or the focus information on the diopter. When the diopter, anti-reflection, and/or rota-pola is present, the filter information system 712 can indicate its presence on the display screen 716 and record the information for later use and as described herein.

In the examples described herein, the matte box 700 is configured to read informational data regarding the attached filters, display the informational data, and sent the information data to other remote external devices. Additionally, the matter box 700 can receive and display informational data from the remote external devices. For example, a range finder (not shown) may be attached to the matte box 700, and the range finder distance may be received and displayed on the matte box 700. In some examples, the matte box 700 may include an accessory port (not shown) for coupling external devices to the matte box 700 (e.g., the range finder) and enabling data and electrical power to be transferred between.

Once the filter informational data is recorded by the controller 722, the data can be used to mesh with the camera files or any other file as required or desired during post production camera file work. For example, the informational data can be meshed with the camera file in a software program so that the filter type and/or position is easily known. In the example, the controller 722 has an external memory port 730 (e.g., a micro SD or the like) so that the informational data is recorded and can be transferred to another location for the meshing. In other examples, the informational data can be sent directly to the camera, if the camera and the matte box are coupled in communication together (e.g., wired or wireless).

In some examples, the filter information system 712 includes a time clock so that time can be logged during the recordation of the filter data. This allows for the camera file to mesh with the filter data more easily. In some examples, the filter information system has an internal time clock that can be used to log time information with the filter information. In other examples, the matte box can couple to an external timecode device so that the internal time cock is based and synced with the external device. For example, before camera work begins, the camera, the matte box, as well as any other device, can all be synced with a master timecode device so that post production work is easier to mesh. To facilitate time clock syncing, the controller 722 can include one or more connector ports 732 that allows standardized timecode, power, and camera connectivity. The connector ports 732 can be located behind the memory port 730. In other examples, one or more of the connector ports 732 may be located on a stationary portion of a swing away arm so that the connector port location is stationary relative to the camera. The connector ports 732 can include a LEMO connector port and/or any other connector type port (e.g., USB-C, R232, and the like) for wired connections. These connector ports can both send and receive information to and from the connected devices. For example, the LEMO connector port may be used for the time sync functionality with the timecode device and/or direct wired communication with the camera. In another example, the matte box may couple to the camera with a R232 type connector cable. In some examples, the wired connections may be located on a swing arm (not shown) of the matte box that is used to support the matte box on the rods of the camera mount. This position enables the matte box to daisy chain off of other camera components, such as, but not limited to a motor control unit (e.g., lens control motor). In other examples, the filter information system 712 can couple in wireless communication (e.g., Wi-Fi, Bluetooth, and the like) to any external device (e.g., camera, timecode device, etc.) as required or desired.

In other examples, the filter information system 712 may include a gyroscopic sensor (not shown) for recording motion data information of the matte box 700. Motion data can include acceleration, deceleration, and the like, and for use in stabilizing the captured images in post-production.

Figure 9:
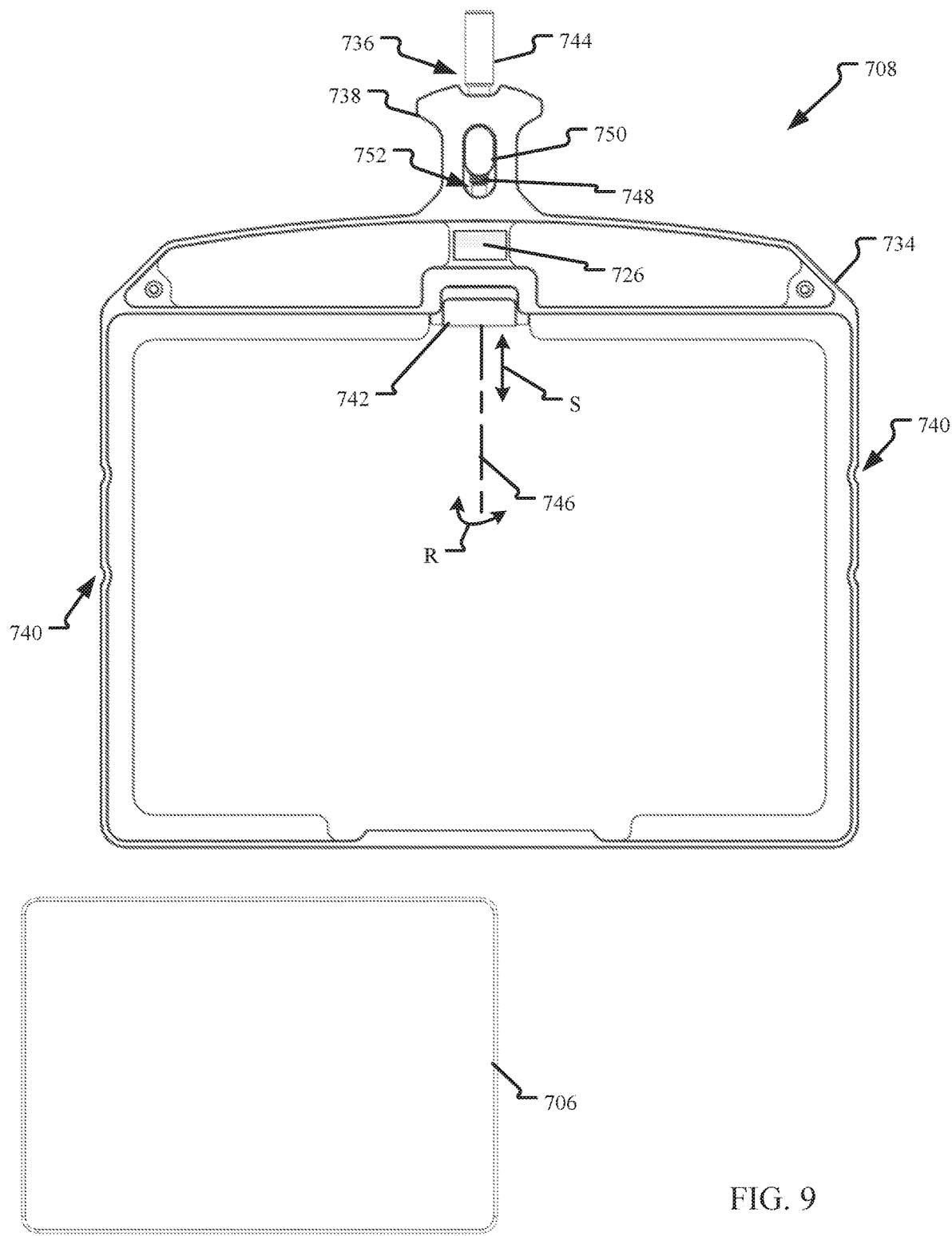
FIG. 9 is a rear view of a filter tray and a filter of the matte box shown in FIG. 7.

FIG. 9 is a rear view of the filter tray 708 and the filter 706 of the matte box 700 (shown in FIG. 7). The filter tray 708 is configured to releasably support the filter 706 and secure to the filter tray holder 704 (shown in FIG. 7) of the matte box. The filter tray 708 includes a body 734 configured to at least partially surround a perimeter of the filter 706 and a compression clamp 736 configured to releasably secure the filter 706 to the body 734. In the example, the body 734 has a handle 738 that extends therefrom and is configured to support the compression clamp 736. Additionally, one or more notches 740 are defined in the sidewalls of the body 734. The notches 740 can be utilized to secure the filter tray 708 within the filter tray holder 704 as described further below in reference to FIGS. 10 and 11.

The compression clamp 736 includes a clamp 742 that is configured to engage an edge of the filter 706 and compress the filter 706 at least partially against an opposing side of the body 734 so as to secure the filter 706 within the filter tray 708. A rod 744 is rotatably coupled to the clamp 742 and defines a longitudinal axis 746. The rod 744 is slidable and rotatably supported by the handle 738. The rod 744 sliding S along the longitudinal axis 746 is used to move the clamp 742 substantially orthogonal to the edge of the filter 706 so that the filter 706 can be removed as required or desired. The rod 744 is also rotatable R around the longitudinal axis 746. In the example, rotation of the rod 744 can selectively lock the position of the clamp 742 so as to prevent the filter 706 from being removed from the filter tray 708.

The rod 744 includes a threaded portion 748 that is threadingly engaged with a block 750. The block 750 is captured at least partially within a channel 752 of the handle 738. The block 750 is moveable along the longitudinal axis 746 between at least a first position and a second position within the channel 752 and via rotation R of the rod 744. The block 750 is illustrated in the second position in FIG. 9. In the second position, the block 750 is disposed at the top of the channel 752, and as such, when the filter 706 is within the body 734, the rod 744 is restricted from sliding S and the filter 706 is locked within the filter tray 708. To unlock the filter 706, the rod 744 is rotated R so as to slide the block 750 towards the first position (not shown) and at the bottom end of the channel 752. This first position of the block 750 enables the rod 744 to slide S and release the clamp 742 from the filter 706.

In the example, the tag 726 is coupled to, or embedded within, the filter tray 708. It should be appreciated that in other examples, the tag 726 can be coupled to, or embedded within the filter 706 itself. The tag 726 includes informational data regarding the filter 706 (e.g., type, name, code, or any other identifying information as required or desired) that can be read and collected by the reader device 724 (shown in FIG. 8). In the example, the tag 726 can be a radio-frequency identification (RFID) tag encoded with the information data of the filter 706. These RFID tags are programmable as required or desired so that the information about the filter 706 can be embedded within the tag 726. Other reader/tag systems are also contemplated herein. The tags 726 can be configured to be readable by the reader device at any rotational or vertical position. Because the reader device reads the tags 726 through components of the matte box, the matte box (e.g., the frame, filter tray holder, filter trays, etc.) are constructed out of the materials that increase the efficiency and performance of the data reading system. For example, the filter tray 708 may be formed from a fiberglass, fiberglass type material, a nylon based material, or the like so that RFID signal penetration is increased.

Figure 10:
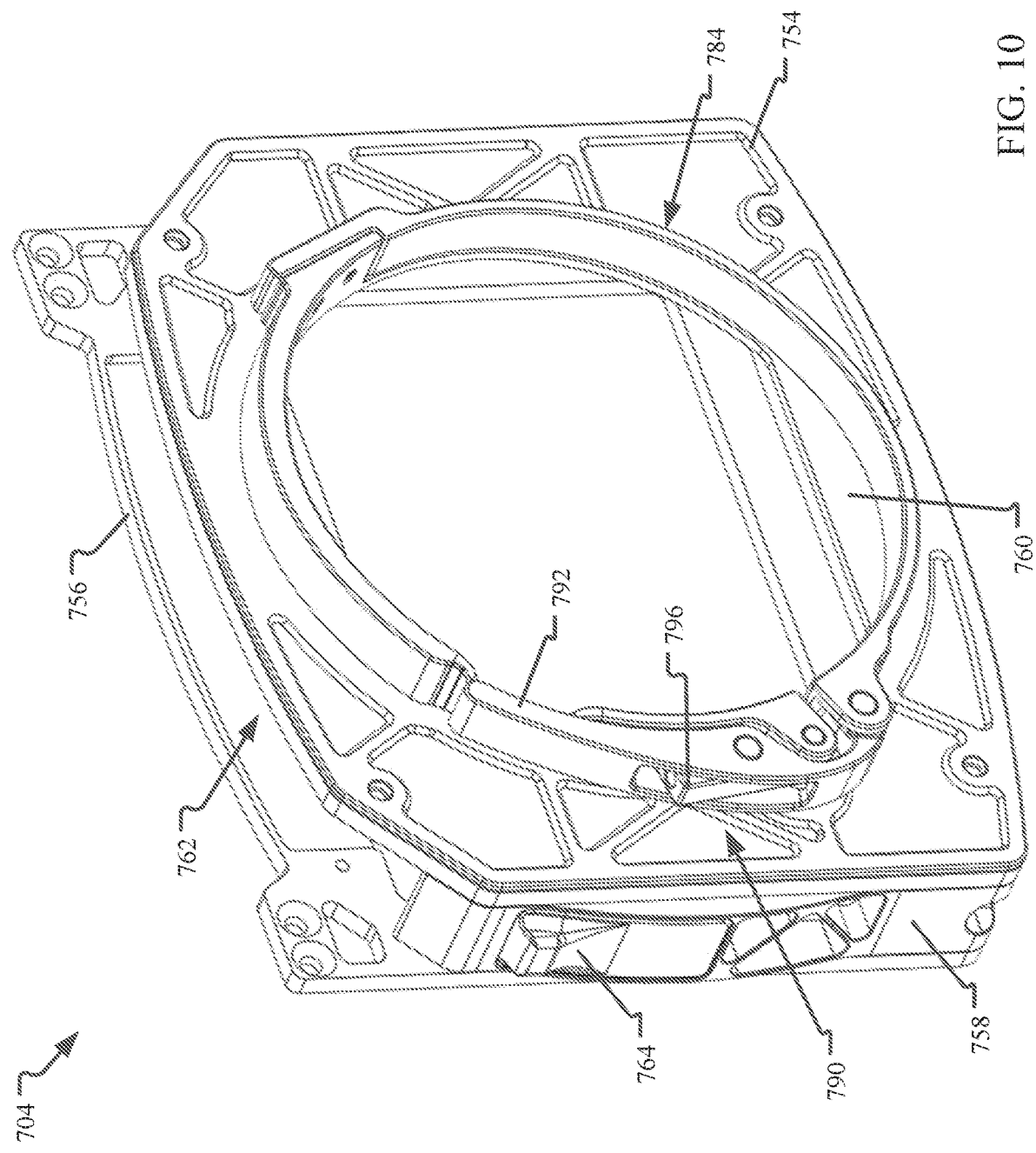
FIG. 10 is a rear perspective view of a filter tray holder of the matte box shown in FIG. 7.

FIG. 10 is a rear perspective view of a filter tray holder 704 of the matte box 700 (shown in FIG. 7). The filter tray holder 704 is configured to removably receive and secure one or more filter trays 708 so that the filter 706 (both shown in FIG. 9) is positioned within the matte box and in front of the camera lens. The filter tray holder 704 includes a mounting plate 754 configured to secure the filter tray holder 704 to the lens of the camera. Opposite of the mounting plate 754, the filter tray holder 704 includes a front plate 756 that the frame 702 (shown in FIG. 8) mounts to. Between the plates 754, 756, the filter tray holder 704 includes two opposing sidewalls 758 and a bottom wall 760. In some examples, the bottom wall 760 can be removable from the sidewalls 758. The filter tray holder 704 defines an interior chamber 762 that is open on top so as to receive the filter trays 708/filters 706. One or more stages are defined within the interior chamber 762 and correspond to the front-back position of the filter trays/filters. In some examples, one or more dividers (not shown) may be disposed within the interior chamber 762 so as to further define the stages. In the example, the filter tray holder 704 is a three-stage housing and configured to hold three filter trays/filters. In other examples, the filter tray holder 704 can include any other number of stages (e.g., two, four, five, etc.).

As illustrated, the filter tray holder 704 is a top load tray holder, whereby the filter trays are loaded from the top. In other examples, the filter tray holder 704 may be a side load tray holder, whereby the opening to the interior chamber 762 is through one of the left or right sidewalls. In this aspect, the filter trays are loaded from the sides, however, the filter tray holder 704 can still include the features as described herein.

Figure 11:
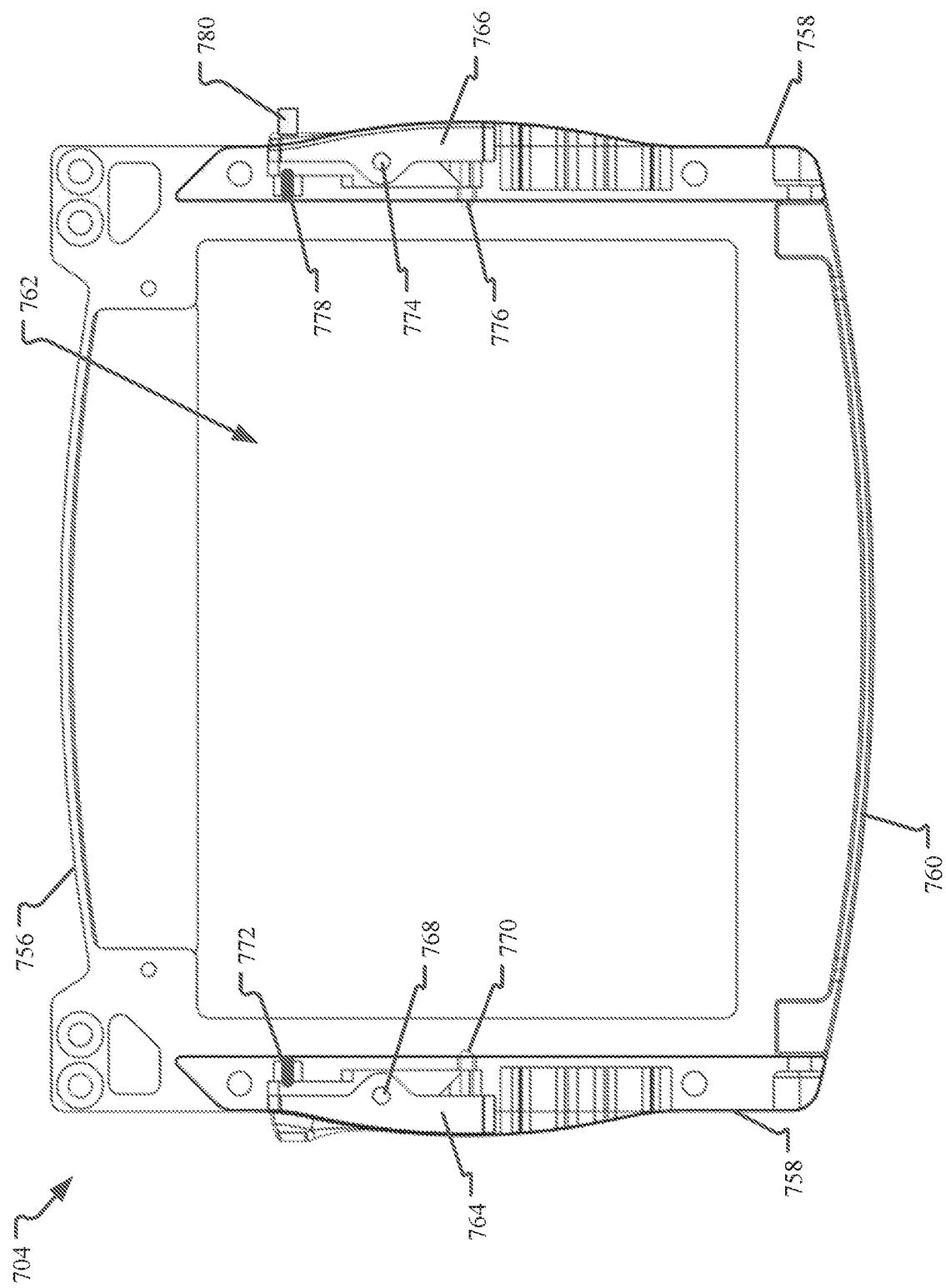
FIG. 11 is a partial rear view of the filter tray holder shown in FIG. 10.

FIG. 11 is a partial rear view of the filter tray holder 704. With continued reference to FIG. 10, one of the sidewalls 758 includes a release lever 764 and the other of the sidewalls 758 includes a locking lever 766. The release lever 764 and the locking lever 766 are disposed on opposing sides of the interior chamber 762 and are configured to engage with the filter trays when inserted therein. The release lever 764 is pivotably supported at a pivot point 768 and one end of the lever 764 has a post 770 extending therefrom. The post 770 is configured to engage with the notch 740 on the filter tray 708 (both shown in FIG. 9). In the example, the post 770 extends across all of the stages within the interior chamber 762. The other end of the lever 764 is biased (e.g., via a spring 772) so as to urge the post 770 in a direction towards the interior chamber 762.

The locking lever 766 is also pivotably supported at a pivot point 774 and one end of the lever 766 has a post 776 extending therefrom. The post 776 is configured to engage with the notch on the filter tray. In the example, the post 776 extends across all of the stages within the interior chamber 762. The other end of the lever 764 is biased (e.g., via a spring 778) so as to urge the post 776 in a direction towards the interior chamber 762. Because both levers 764, 766 are biased towards an engaging position with the filter tray, the filter tray can be slid into the filter tray holder 704 from the top and snap lock into place via the posts 770, 776. Additionally, to remove the filter tray, the release lever 764 can be depressed to overcome the spring 772 and release the post 770 so as to slide the filter tray out to the top of the filter tray holder 704. The locking lever 766 does not necessary need to be released as releasing one side of the filter tray allows removal of the filter tray.

In the example, the locking lever 766 also includes a positioning lock 780 that is disposed adjacent the spring 778. The positioning lock 780 is configured to lock the position of the locking lever 766 with respect to the sidewall 758 so that the post 776 cannot disengage with the filter tray. When the position of the locking lever 766 is fixed, the securement of the filter tray within the filter tray holder 704 is increased. In the example, the locking lever 766 is a thumb screw. In other examples, the positioning lock 780 is any other mechanical position lock that enables the locking lever 766 to function as described herein.

Figure 12:
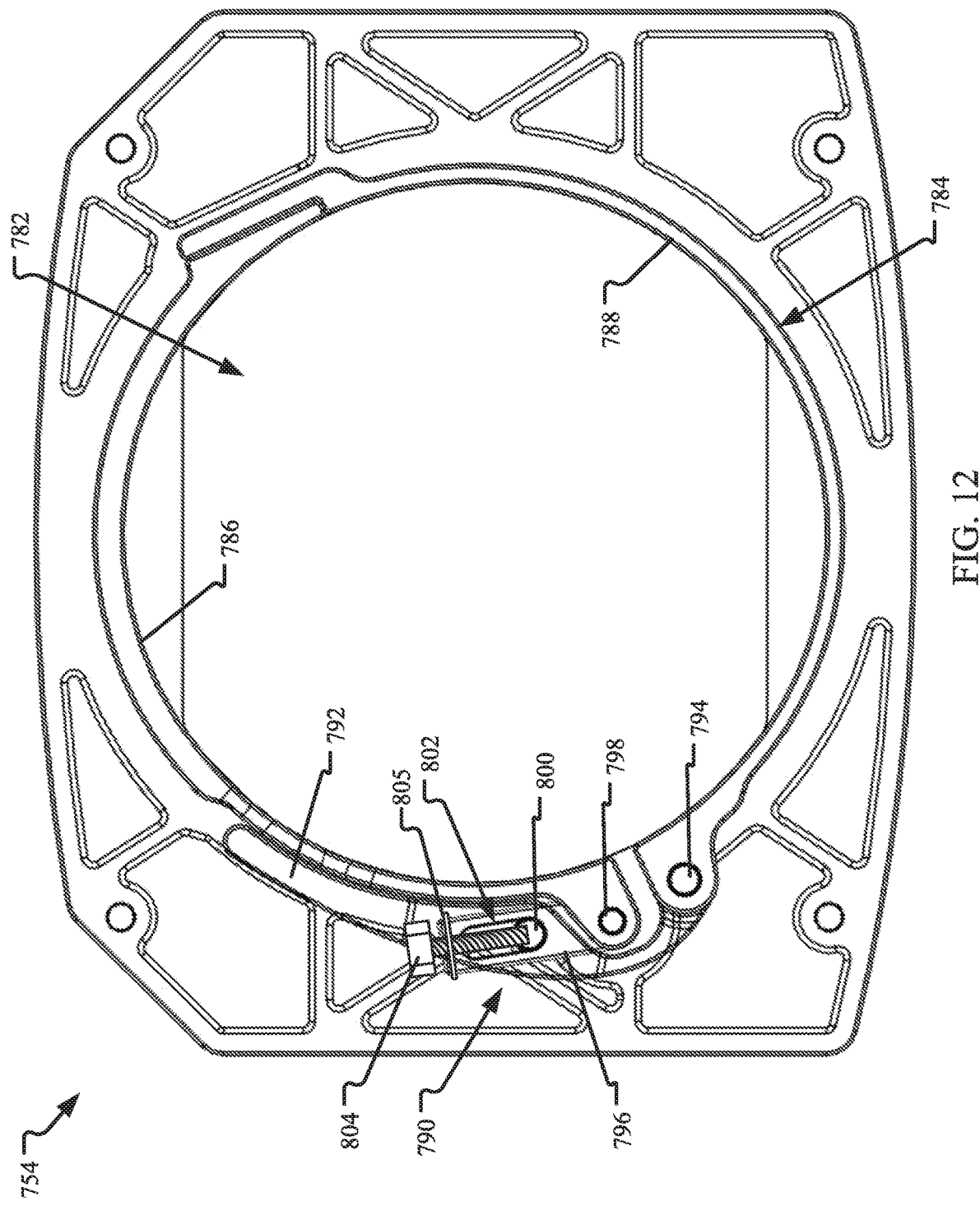
FIG. 12 is a rear view of a mounting plate of the filter tray holder shown in FIG. 10.

FIG. 12 is a rear view of the mounting plate 754 of the filter tray holder 704 (shown in FIG. 10). With continued reference to FIG. 10, the mounting plate 754 includes an opening 782 that allows light to reach the camera lens. Surrounding the opening 782, a circumferential lock ring 784 is configured to secure the filter tray holder 704 to the camera lens. The lock ring 784 has a first member 786 and a second member 788 that are configured to radially compress around the camera lens so as to fictionally secure the lock ring 784 to the camera lens. The free ends of each of the members 786, 788 are coupled to a quick release latch 790 that is utilized to move the members 786, 788. In some examples, the mounting plate 754 may include two discrete plates, a forward plate that defines the chamber that receives the filters and filter trays, and a rearward plate that includes the circumferential lock ring 784.

In the example, the release latch 790 includes a lever 792 that is pivotably coupled to the free end of the second member 788 at a pivot point 794. The release latch 790 also includes an adjustment arm 796 that is pivotably coupled to the free end of the first member 786 at a pivot point 798. Additionally, the release latch 790 and the adjustment arm 796 are coupled to each other at a pivot point 800. The adjustment arm 796 includes a channel 802 so that the pivot point 800 can slide therein during operation of the release latch 790. Additionally, a location of the pivot point 800 can be adjusted as required or desired by a screw bolt 804. By adjusting the position of the pivot point 800, the force required to close the release latch 790 can be increased or decreased. In operation, the three discrete pivot points 794, 798, 800 enable the lever 792 and arm 796 to rotate and radially compress the lock ring 784. When the three pivot points are all linearly aligned, the lock ring 784 it in its most radially compressed position. As illustrated in FIG. 12, however, the locked configuration of the release latch 790 has the pivot point 800 offset from the linear alignment of the most compressed position. As such, during the locking operation, the pivot point 800 rotates past the most compressed position so that to unlock the release latch 790 additional force has to be applied to the lever 792, thereby providing additional securement to the release latch 790. The screw bolt 804 includes a resilient washer 805 disposed proximate its end so as to enable at least some compression within the release latch 790 and allow movement between the locked and unlocked configurations.

In some examples, the mounting plate 754 may include a reader (not shown) that reads information about the camera lens that it attaches to. In this example, a tag may be included on the camera lens and read informational data regarding the camera and/or camera lens. This enables, the filter information system described herein to also read, record, and/or display information regarding the camera lens. In other examples, a swing away arm or a fixed rod mount (not shown) may be coupled to the mounting plate 754 so that the matte box can be secured with the rods of the camera setup.

Figure 13:
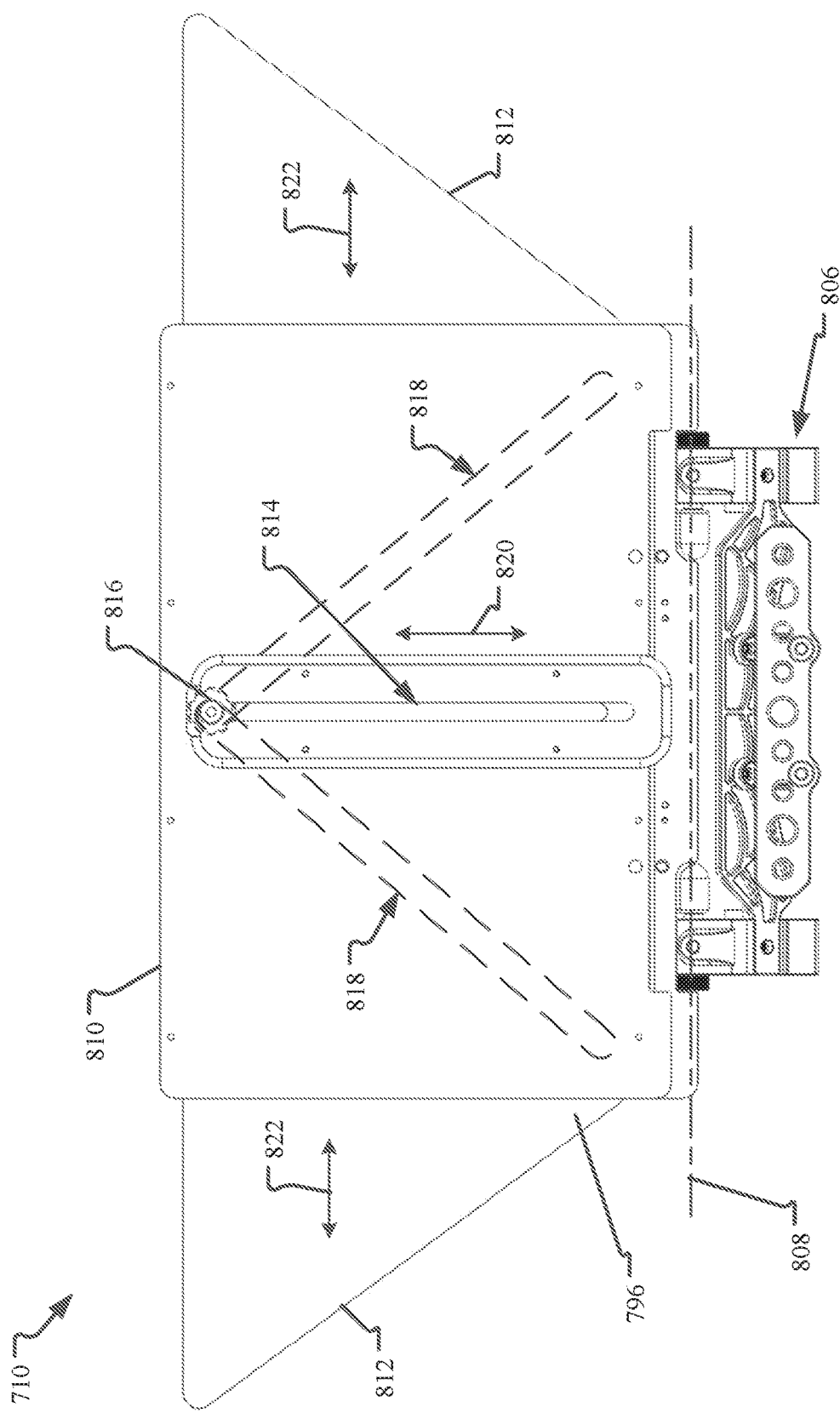
FIG. 13 is a top view of a flag of the matte box shown in FIG. 7.

FIG. 13 is a top view of the flag 710 of the matte box 700 (shown in FIG. 7). The flag 710 includes a mounting bracket 806 that is configured to couple to the frame 702 (shown in FIG. 8) and/or the filter tray holder 704 (shown in FIG. 10). The mounting bracket 806 is described further below and in reference to FIGS. 14 and 15. The flag 710 is pivotable relative to the mounting bracket 806 around a pivot axis 808. The flag 710 includes top and bottom flag members 810 that are stacked on top of one another and separated by a gap. A pair of side flag members 812 are at least partially disposed in the gap and between the top and bottom flag members 810. The top flag member 810 includes an elongated first track 814 that extends substantially orthogonal to the pivot axis 808. The track 814 is configured to receive a screw clamp 816 that is slidable therein. Each of the side flag members 812 include an elongated second track 818 that also receives the screw clamp 816 such that it can slide therein. The second tracks 818 are disposed at an angle relative to the first track 814.

In operation, the screw clamp 816 can be used to extend and retract the side flag members 812 from the sides of the top and bottom flag members 810. As illustrated in FIG. 13, the side flag members 812 are in an extended position and the screw clamp 816 is at a distal end of the elongated first track 814. The screw clamp 816 can be tightened so as to secure its position within the track 814 and hold the position of the side flag members 812. To retract the side flag members 812, the screw clamp 816 slides 820 towards the proximal end, and the corresponding movement in the elongated second tracks 818 retracts the side flag members 812. That is, the screw clamp 816 also moves towards the proximal ends of the second tracks 818, but because the second tracks 818 are angled, the side flag members retract in a direction 822. To extend the side flag members, the screw clamp 816 slides 820 towards the distal end. Accordingly, the side flag members 812 move 822 in a direction that is substantially orthogonal to the elongated first track 814 and the sliding 820 direction of the screw clamp 816.

Figure 14:
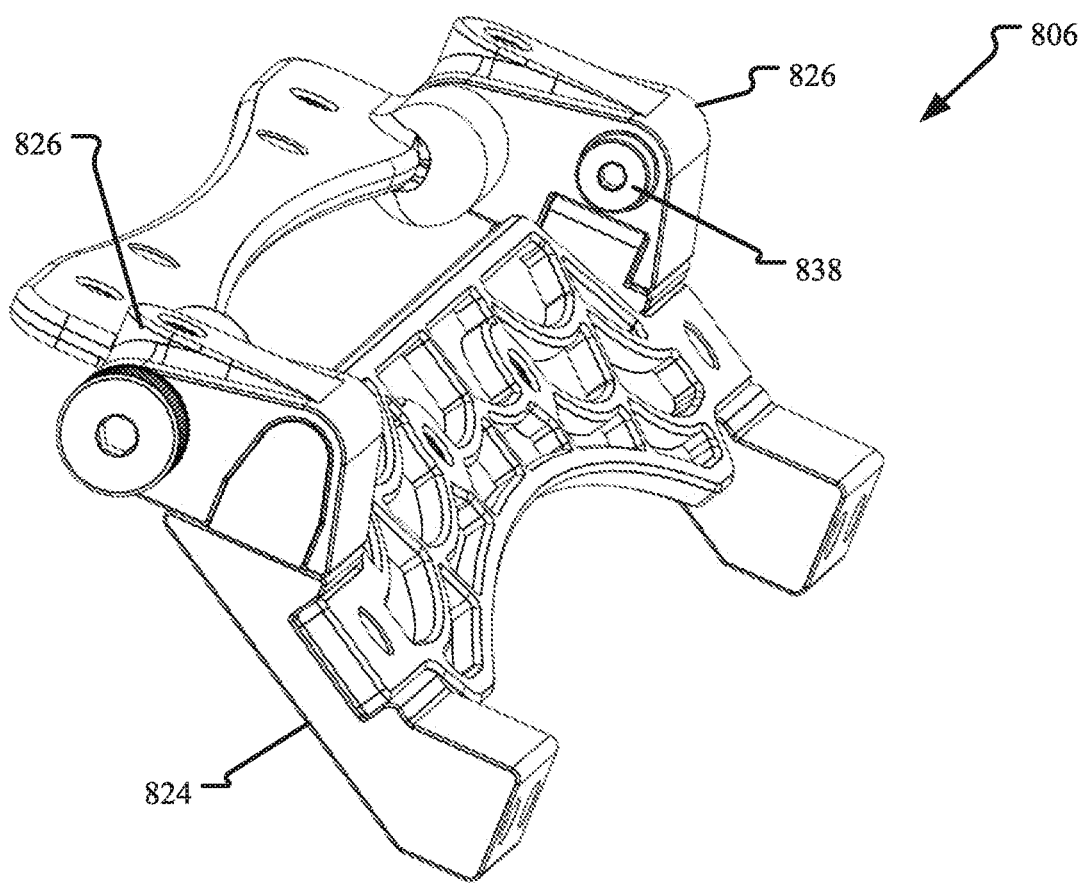
FIG. 14 is a perspective view of a mounting bracket of the flag shown in FIG. 13.
Figure 15:
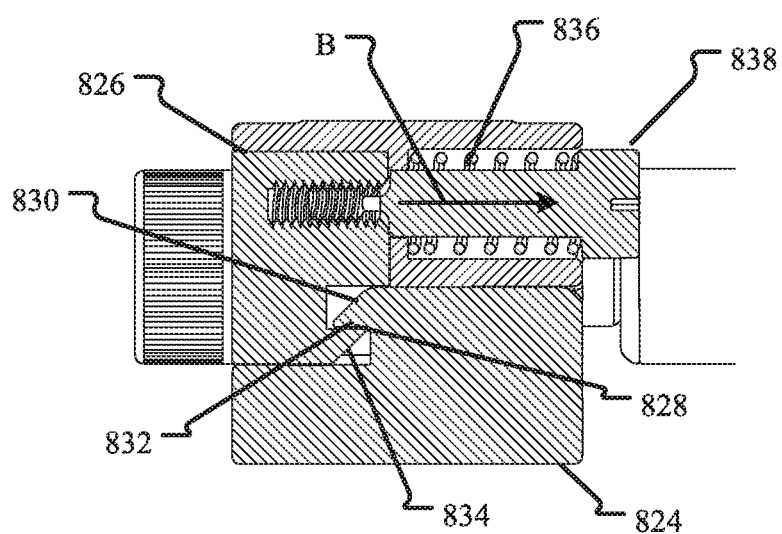
FIG. 15 is a partial cross-sectional view of the mounting bracket shown in FIG. 14.

FIG. 14 is a perspective view of the mounting bracket 806 of the flag 710 (shown in FIG. 13). FIG. 15 is a partial cross-sectional view of the mounting bracket 806. Referring concurrently to FIGS. 14 and 15, the mounting bracket 806 includes a riser 824 that is configured to couple to the front plate of the filter tray holder 704 (shown in FIG. 10). The riser 824 is also configured to releasably couple to one or more clamps 826 of the flag 710 (shown in FIG. 13). The riser 824 includes a first undercut surface 828 and a first oblique surface 830. The clamp 826 includes a second undercut surface 832 and a second oblique surface 834. The clamp 826 is biased B by a spring 836 and a button 838.

In operation, the undercut surfaces 828, 832 are configured to engage with each other and couple to the riser 824 to the clamp 826. To release the clamp 826, the button 838 is depressed so as to disengage the undercut surfaces 828, 832. Because the clamp 826 is spring biased, the oblique surfaces 830, 834 enable the clamp 826 to snap into engagement with the riser 824. The clamp 826 is slidable in a direction that is substantially parallel to the direction of the undercut surfaces 828, 832 and the bias direction of the spring 836.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A matte box for a camera comprising:
    a frame;
    a filter holder having at least one stage configured to receive a filter,
    wherein the filter is removably coupled to the filter holder at the at least one stage so that the filter is positioned in front of a lens of the camera; and
    a filter information system comprising:
        an identification tag coupled to the filter, wherein the identification tag includes informational data regarding the filter; and
        a reader device supported on the frame and configured to receive the informational data from the identification tag,
        wherein the filter information system records the informational data of the filter received in the filter holder.

2. The matte box of claim 1, wherein the filter information system further comprises a display screen supported on the frame and configured to visually display the informational data of the filter received in the filter holder.

3. The matte box of claim 1, wherein the filter information system further comprises a time clock, and wherein during the recordation of the informational data of the filter, time information is logged.

4. The matte box of claim 1, wherein the identification tag is a radio-frequency identification (RFID) tag and the RFID tag is encoded with the informational data, and wherein the reader device is a RFID reader device.

5. The matte box of claim 4, wherein the recordation of the informational data is based on an inductive coupling signal by the RFID reader device.

6. The matte box of claim 1, wherein the filter information system records a position of the filter within the filter holder.

7. The matte box of claim 6, wherein the at least one stage comprises a plurality of stages and the position of the filter is based on signal strength in relation to the reader device.

8. The matte box of claim 6, wherein the at least one stage comprises a plurality of stages and each stage of the plurality of stages includes the reader device.

9. The matte box of claim 1, further comprising at least one filter tray configured to support the filter, wherein the at least one filter tray is removably coupled to the filter holder at the at least one stage so that the filter is positioned in front of the lens of the camera, and wherein the identification tag is coupled to the at least one filter tray.

10. A matte box for a camera comprising:
a frame;
a filter tray holder having a plurality of stages configured to receive a filter;
at least one filter tray configured to support the filter, wherein the at least one filter tray is removably coupled to the filter tray holder at one of the plurality of stages so that the filter is positioned in front of a lens of the camera; and
a filter information system configured to record informational data regarding the filter received in the filter tray holder.

11. The matte box of claim 10, wherein the at least one filter tray comprises:
a body configured to at least partially surround a perimeter of the filter; and
a compression clamp configured to secure the filter to the body, wherein the compression clamp comprises:
a clamp configured to engage an edge of the filter;
a rod coupled to the clamp, wherein the rod is slidingly and rotatably supported by the body, and wherein the rod comprises a threaded portion; and
a block threadingly engaged with the rod and captured at least partially within the body, wherein the block is moveable between at least a first position and a second position relative to the body via rotation of the rod, when the block is in the first position, the rod is slidable relative to the body such that the clamp is moveable in a direction substantially orthogonal to the edge of the filter, and when the block is in the second position, the block is engaged with the body and preventing the rod from sliding to secure the clamp to the filter.

12. The matte box of claim 10, wherein the filter information system comprises:
a radio-frequency identification (RFID) tag coupled to the at least one filter tray and/or the filter, wherein the RFID tag includes the informational data regarding the filter;
a RFID reader device supported on the frame and configured to receive the informational data from the RFID tag; and
display screen supported on the frame and configured to visually display the informational data of the filter received in the filter tray holder.

13. The matte box of claim 12, wherein the filter information system is coupled in communication with a remote user device.

14. A method of capturing informational data of a filter within a matte box for a camera, the method comprising:
encoding a radio-frequency identification (RFID) tag with the informational data of the filter, wherein the RFID tag is coupled to a filter tray that supports the filter and/or the filter;
transmitting a reader signal by a RFID reader device supported on a frame of the matte box;
receiving a response signal from the RFID tag at the RFID reader device containing the informational data of the filter;
recording the informational data at the matte box; and
visually displaying at least a portion of the informational data on a display screen of the matte box.

15. The method of claim 14, further comprising determining a position of the filter within the matte box, recording the position, and displaying the position on the display screen.

16. The method of claim 14, wherein recording the informational data comprises logging time information from a time clock running within the matte box.

17. The method of claim 14, wherein transmitting the reader signal by the RFID reader device is based on an inductive coupling signal of the RFID tag being disposed adjacent the RFID reader device.

18. The method of claim 14, further comprising sending at least a portion of the recorded informational data to the camera.

19. The method of claim 14, further comprising syncing a running time clock within the matte box with an external timecode generator.

20. The method of claim 14, further comprising visually displaying at least a portion of the informational data on the camera or a remote device.

* * * * *